United States Patent [19]
Smith et al.

[11] Patent Number: 5,877,100
[45] Date of Patent: *Mar. 2, 1999

[54] COMPOSITIONS AND INSULATION BODIES HAVING LOW THERMAL CONDUCTIVITY

[75] Inventors: Douglas M. Smith; William C. Ackerman; Alok Maskara, all of Albuquerque, N. Mex.

[73] Assignee: Cabot Corporation, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 721,797

[22] Filed: Sep. 27, 1996

[51] Int. Cl.$^6$ ...................................................... C04B 3/00
[52] U.S. Cl. ...................... 501/12; 252/62; 252/315.01; 252/315.1; 252/315.6; 252/315.7; 423/335; 423/338; 423/592; 423/610; 423/625
[58] Field of Search .............................. 501/12; 252/62, 252/315.01, 315.1, 315.6, 315.7; 423/335, 338, 592, 610, 625

[56] References Cited

U.S. PATENT DOCUMENTS

| | | | |
|---|---|---|---|
| 2,745,173 | 5/1956 | Janos | 29/455 |
| 2,973,282 | 2/1961 | Gross | 106/308 |
| 3,367,742 | 2/1968 | Marotta et al. | 23/182 |
| 3,453,127 | 7/1969 | Marotta et al. | 106/192 |
| 3,790,243 | 2/1974 | Whorton, III | 312/214 |
| 3,869,334 | 3/1975 | Hughes et al. | 161/87 |
| 3,962,014 | 6/1976 | Hughes et al. | 156/276 |
| 4,150,101 | 4/1979 | Schmidt et al. | 423/338 |
| 4,159,359 | 6/1979 | Pelloux-Gervais et al. | 428/76 |
| 4,284,674 | 8/1981 | Sheptak . | |
| 4,399,175 | 8/1983 | Kummermehr et al. . | |
| 4,444,821 | 4/1984 | Young et al. . | |
| 4,564,547 | 1/1986 | Hughes . | |
| 4,583,351 | 4/1986 | Takahashi et al. | 501/87 |

(List continued on next page.)

FOREIGN PATENT DOCUMENTS

| | | |
|---|---|---|
| 0 254 993 A2 | 2/1988 | European Pat. Off. . |
| 0 340 707 A2 | 4/1989 | European Pat. Off. . |
| 0 409 083 A1 | 6/1990 | European Pat. Off. . |
| 0 409 082 A1 | 7/1990 | European Pat. Off. . |
| 0 535 977 A1 | 4/1993 | European Pat. Off. . |
| 0 715 138 A2 | 6/1996 | European Pat. Off. . |
| 3533805 A1 | 3/1987 | Germany . |
| WO 96/14266 | 5/1996 | Germany . |
| 8-34678 | 2/1996 | Japan . |
| 8-105592 | 4/1996 | Japan . |
| 8-105687 | 4/1996 | Japan . |
| 1 268 626 | 3/1972 | United Kingdom . |

(List continued on next page.)

OTHER PUBLICATIONS

"Powder–Filled Evacuated Thermal Insulation Panel," *New Materials & New Processes*, vol. 3 (1985), by H. Yoneno.
Proceedings of the Fourth International Symposium on AEROGELS, Sep. 19–21, 1994, *Journal of Non–Crystalline Solids*, vol. 186.
*Sol–Gel Science, The Physics and Chemistry of Sol–Gel Processing*, by c. Jeffrey Brinker, Sandia National Laboratories and George W. Scherer, E.I. du Pont de Nemours & Company.

(List continued on next page.)

*Primary Examiner*—Paul Marcantoni

[57] ABSTRACT

The present invention relates to particulate compositions having improved thermal conductivity values. An embodiment of the present invention is a particulate composition which under a 103421 Pa load, at 20° C., and at a pressure (P) within the range of 133.322–13332.2 Pa, in Nitrogen, has: a packing density of less than or equal to 160 kg/m3, and a Thermal Conductivity (TC) at 133.322–1333.22 Pa of less than or equal to (0.260 lnP+4.53) milliWatt/meterK (mW/m·K) and a TC at 1333.22–13332.2 Pa of less than or equal to (0.824 lnP+0.47) mW/m·K. A preferred particulate composition is a gel composition. Also disclosed are insulation bodies comprising the particulate compositions.

57 Claims, 12 Drawing Sheets

U.S. PATENT DOCUMENTS

| | | |
|---|---|---|
| 4,594,279 | 6/1986 | Yoneno et al. . |
| 4,636,416 | 1/1987 | Kratel et al. . |
| 4,667,417 | 5/1987 | Graser et al. . |
| 4,681,788 | 7/1987 | Barito et al. . |
| 4,704,374 | 11/1987 | Jacques . |
| 4,726,974 | 2/1988 | Nowobilski et al. . |
| 4,798,753 | 1/1989 | Abuaf et al. . |
| 4,954,327 | 9/1990 | Blount . |
| 4,997,804 | 3/1991 | Pekala . |
| 5,018,328 | 5/1991 | Cur et al. . |
| 5,032,439 | 7/1991 | Glicksman et al. . |
| 5,076,984 | 12/1991 | Bisplinghoff et al. . |
| 5,082,335 | 1/1992 | Cur et al. . |
| 5,084,320 | 1/1992 | Barito et al. . |
| 5,086,085 | 2/1992 | Pekala . |
| 5,091,233 | 2/1992 | Kirby et al. . |
| 5,122,291 | 6/1992 | Wolff et al. ............................... 252/62 |
| 5,124,101 | 6/1992 | Hirao et al. ............................... 264/82 |
| 5,124,364 | 6/1992 | Wolff et al. . |
| 5,137,927 | 8/1992 | Wolff et al. . |
| 5,252,408 | 10/1993 | Bridges et al. . |
| 5,273,801 | 12/1993 | Barry et al. . |
| 5,275,796 | 1/1994 | Tillotson et al. . |
| 5,294,480 | 3/1994 | Mielke et al. ........................... 428/240 |
| 5,306,555 | 4/1994 | Ramamurthi et al. ................... 428/289 |
| 5,316,816 | 5/1994 | Sextl et al. . |
| 5,327,703 | 7/1994 | Cur et al. . |
| 5,331,789 | 7/1994 | Cur et al. . |
| 5,364,577 | 11/1994 | Cur et al. . |
| 5,376,348 | 12/1994 | Stolilov et al. . |
| 5,376,449 | 12/1994 | Harris et al. . |
| 5,391,364 | 2/1995 | Cogliati . |
| 5,395,805 | 3/1995 | Droege et al. . |
| 5,399,408 | 3/1995 | Nowara . |
| 5,409,683 | 4/1995 | Tillotson et al. . |
| 5,420,168 | 5/1995 | Mayer et al. . |
| 5,478,867 | 12/1995 | Tabor . |
| 5,480,696 | 1/1996 | Harris et al. . |
| 5,587,107 | 12/1996 | Schwertfeger et al. .............. 252/315.6 |
| 5,646,079 | 7/1997 | Eckstein .................................. 501/100 |

FOREIGN PATENT DOCUMENTS

| | | |
|---|---|---|
| WO 94/25149 | 11/1994 | WIPO . |
| WO 94/26406 | 11/1994 | WIPO . |
| WO 95/00580 | 1/1995 | WIPO . |
| WO 95/00581 | 1/1995 | WIPO . |
| WO 96/06809 | 3/1996 | WIPO . |
| WO 96/12683 | 5/1996 | WIPO . |
| WO 96/15997 | 5/1996 | WIPO . |
| WO 96/15998 | 5/1996 | WIPO . |

OTHER PUBLICATIONS

"Microcellular Polyurea Xerogels for Use in Vacuum Panels" by R.L. Tabor, 35th Annual Polyurethane Technical/Marketing Conference, Oct. 9–12, 1994.

"Thermal Conductivity of Granular $SiO_2$ Aerogel," by D. Buttner, E. Hummer and J. Fricke, *Physikalisches Institut der Universitat,* Am Hubland, D–8700, Wurzburg, F.R.G.

"Thermal Properties of Silica Aerogels," by J. Fricke, E. Hummer, H.–J. Morper and P. Scheuerpflug, *Revue de Physique Appliquee,* Colloque, C4, Supplement au No. 4, Tome 24, Avril 1989.

"Thermal transport in organic and opacified silica monolithic aerogels," *Journal of Non–Crystalline Solids* 145 (1992) 207–210 North–Holland, by X. Lu, P. Wang, M.C. Arduini–Schuster, J. Kuhn, D. Buttner, O. Nilsson, U. Heinemann and J. Fricke.

"Thermal conductivity of silica aerogel powders at temperatures from 10 to 275 K," *Journal of Non–Crystalline Solids* 186 (1995) 278–284, by Th. Rettelbach, J. Sauberlich, S. Korder, J. Fricke.

"Santocel," Technical Bulletin 1–180, Oct., 1959, Monsanto Chemical Company.

"Heat–transfer in opacified aerogel powders," *Journal of Non–Crystalline Solids* 145 (1992) 211–216 North–Holland by E. Hummer, X. Lu, Th. Rettelbach and J. Fricke.

Proceedings of the International Conference on Thermal Insulation, vol. Eight, 1992, presented at the Eigth International Conference on Thermal Insulation, Mar. 9 to 11, 1992.

"Standard Test Method for Steady–State Thermal Transmission Properties by Means of the Thin–Heater Apparatus," *Annual Book of ASTM Standards,* vol. 04.06, Designation C 1114–92.

"Standard Terminology Relating to Thermal Insulating Materials," *Annual Book of ASTM Standards,* Designation C 168–90.

"Literature Review: Heat Transfer Through Two–Phase Insulation Systems Consisting of Powders in a Continuous Gas Phase," ORNL, Martin Marietta Energy Systems, Inc., by David W. Yarbrough.

"Thermal Properties of Organic and Inorganic Aerogels", *J. Mater,* vol. 9, No. 3, Mar. 1994 by Lawrence W. Hrubesh and Richard W. Pekala.

"On the Way to Commercial Production of Silica Aerogel," *Journal of Non–Crystalline Solids* 186 (1995) 380–387 by G. Herrmann, R. Iden, M. Mielke, F. Teich, B. Ziegler.

"Optimization of monolithic silica aerogel insultants," *Int. J. Heat Mass Transfer,* vol. 35, No. 9, pp. 2305–2309, 1992, by J. Fricke, X. Lu, P. Wang, D. Buttner and U. Heinemann.

"Opacified Silica Aerogel Powder Insulation," *Thermochimica Acia.* 218 (1993) 269–276, by E. Hummer, Th. Rettelbach, X. Lu, J. Fricke.

"Open Cel Isocyanurate Foams for Vacuum Insulation Panels," *Journal of Cellular Plastics,* vol. 31, Mar. 1995, by Kaneyoshi Ashida and Josho Iashiwame.

"Development of Micro Cellular Open Cell Rigid Polyurethane Foams," Polyurethanes World Congress 1993––Oct. 10–13, 1993, by K. Kodama, K. Yuge, Y. Masuda and Y. Tanimoto.

"The Thermal Resistance of Fine Powders at Atmospheric Pressure and under Vacuum," Metals and Ceramics Division, Oak Ridge National Laboratory, by D.L. McElroy, F.J. Weaver, D.W. Yarbrough and R.S. Graves.

"New organic aerogels based on a phenolic–furfural reaction," *Journal of Non–Crystalline Solids* 188 (1995) 34–40, by R.W. Pekala, C.T. Alviso, X. Lu, J. Gross and J. Fricke.

"Deformation of aerogels during characterization," *Journal of Non–Crystalline Solids* 186 (1995) 309–315, by George W. Scherer, Douglas M. Smith and David Stein.

"Preparation of low–density xerogels at ambient pressure," *Journal of Non–Crystalline Solids* 186 (1995) 104–112, by Douglas M. Smith, David Stein, Julie M. Anderson and William Ackerman.

"Aerogels — A Fascinating Class of High–Performance Porous Solids," Proceedings of the First International Symposium, Wurzberg, Fed. Rep. of Germany, Sep. 23–25, 1985, by J. Fricke.

"Plastic behaviour of aerogels under isostatic pressure," *Journal of Non–Crystalline Solids* 186 (1995) 321–327, by L. Duffours, T. Woignier and J. Phalippou.

"Interpretation of mercury porosimetry applied to aerogels," *J. Mater. Res.,* vol. 10, No. 8, Aug. 1995, by R. Pirard, S. Blacher, F. Brouers and J.P. Pirard.

"Aerogels — Nanoporous Materials, Part I: Sol–Gel Process and Drying of Gels," *Journal of Porous Materials,* 1.7–17 (1995), by T. Heinrich, U. Klett and J. Fricke.

COMPOSITIONS AND INSULATION BODIES HAVING LOW THERMAL CONDUCTIVITY

FIELD OF THE INVENTION

The present invention relates to compositions with improved thermal conductivity properties. The present invention also relates to insulation bodies comprising the compositions.

BACKGROUND

Insulation materials are currently utilized in applications which include windows, buildings, appliances, as well as other industrial and home equipment. One type of insulation is "powder-in-vacuum" insulation, wherein a vacuum space is filled with a particulate insulating composition, such as a powder. Powder-in-vacuum insulation may be utilized in insulation panels, in applications including home and industrial appliances, including refrigerators, water heaters, and equipment for the storage and transport of high and low temperature liquids.

The terminology "vacuum panel" or "vacuum insulation panel" may be utilized to describe powder-in-vacuum insulation, e.g. an insulation structure having reduced internal pressure. Vacuum insulation panels generally comprise an insulating composition and a vessel formed of a substantially impermeable film surrounding the filler material. The vessel is generally evacuated to an internal pressure below atmospheric pressure and hermetically sealed. In addition to providing insulating value, the functions of the insulating composition include supporting the skin of the vessel so that the vessel does not collapse during evacuation.

Vacuum insulation panels may be advantageously utilized in insulation applications including the walls of the refrigeration appliances. It is advantageous for such panels to remain effective for the life of the appliance, which may exceed 20 years.

The insulating characteristics of a vacuum panel are a function of the thermal conductivity of the particulate composition utilized and the degree of vacuum established and maintained.

There are at least several difficulties which may be encountered in the use of an insulating system in which a vacuum space is filled with an insulation material. In general, greater insulating values are achieved at vacuum levels farther beneath ambient, or put another way, thermal conductivity increases with increasing absolute pressure. As a result, manufacturing costs are increased by the need to establish vacuum levels farther beneath ambient (low absolute pressures), to provide a greater initial insulating value (lower thermal conductivity) and to minimize the reduction of the insulating value as a result of the loss of vacuum level through leakage, temperature increase and/or insulation material off-gassing. In addition, manufacturing and production costs are increased by the need for substantially gas impermeable barrier materials (e.g. vacuum bags) which will hold the insulation material, and maintain low vacuum levels.

It would be advantageous to have compositions which achieve improved thermal conductivities. Such compositions would be advantageous for use in insulation structures including, but not limited to, insulation panels having reduced internal pressures or other forms of powder-in-vacuum insulation.

SUMMARY OF THE INVENTION

The present invention provides a particulate composition which under 103421 Pa (15 psi) load, at 20° C. (Celsius), and at a pressure (P) within the range of 133.322–13332.2 Pa (1–100 Torr), in Nitrogen has:
 a packing density of less than or equal to 160 kilograms per cubic meter ($kg/m^3$) and
 a Thermal Conductivity (TC) at 133.322–1333.22 Pa of less than or equal to (0.260 lnP+4.53) milliWatt/meterK (mW/m·K) (TC≦(0.260 lnP+4.53) mW/m·K) and a TC at 1333.22–13332.2 Pa of less than or equal to (0.824 lnP+0.47) mW/m·K (TC≦(0.824 lnP+0.47) mW/m·K).

In accordance with one aspect of the present invention there is provided a particulate composition which under a 103421 Pa load, at 20° C., and at a pressure of 133.322 Pa (1 Torr), in Nitrogen, has:
 a packing density of less than or equal to 160 $kg/m^3$, and
 a TC of less than or equal to 5.8 mW/m·K.

In accordance with another aspect of the present invention there is provided a particulate composition which under a 103421 Pa load, at 20° C., and at a pressure of 1333.22 Pa (10 Torr), in Nitrogen, has:
 a packing density of less than or equal to 160 $kg/m^3$, and
 a TC of less than or equal to 6.4 mW/m·K.

In accordance with a further aspect of the present invention there is provided a particulate composition which under a 103421 Pa load, at 20° C., and at a pressure of 13332.2 Pa (100 Torr), in Nitrogen, has:
 a packing density of less than or equal to 160 $kg/m^3$, and
 a TC of less than or equal to 9 mW/m·K.

In accordance with a further aspect of the present invention there is provided a particulate composition which under 103421 Pa (15 psi) load, at 20° C., and at any pressure (P) range of 133.322–13332.2 Pa (1–100 Torr), in Nitrogen, has:
 a packing density of less than or equal to 160 $kg/m^3$, and
 a Thermal Conductivity (TC) at 133.322–1333.22 Pa of less than or equal to (0.260 lnP+4.53) milliWatt/meterK (mW/m·K) (TC≦(0.260 lnP+4.53) mW/m·K) and a TC at 1333.22–13332.2 Pa of less than or equal to (0.824 lnP+0.47) mW/m·K (TC≦(0.824 lnP+0.47) mW/m·K).

As used herein with reference to the compositions of the present invention "particulate" refers to a non-monolithic structure comprising discrete particles, granules, fibers and/or mixtures thereof. A preferred composition of the present invention is a gel composition.

In accordance with a further aspect of the present invention there is provided a gel composition produced without supercritical drying having a porosity of greater than or equal to 0.95 and a rod density of less than or equal to 100 $kg/m^3$.

The present invention also provides an insulation body comprising a composition of the present invention.

The features and advantages of the compositions and insulation of the present invention will become apparent from the following more detailed description.

DETAILED DESCRIPTION OF THE INVENTION

The present invention provides a particulate composition which under 103421 Pa (15 psi) load, at 20° C. (Celsius), and at a pressure (P) within the range of 133.322–13332.2 Pa (1–100 Torr), in Nitrogen, has:

- a packing density of less than or equal to 160 kg/m$^3$, preferably less than or equal to 140 kg/m$^3$, more preferably 10–120 kg/mg$^3$ and
- a Thermal Conductivity (TC) at 133.322–1333.22 Pa of less than or equal to (0.260 lnP+4.53) milliwatt/meterK (mW/m·K) (TC≦(0.260 lnP+4.53) mW/m·K), preferably less than or equal to (0.304 lnP+3.91) mW/m·K (TC≦(0.304 lnP+3.91) mW/m·K) and a TC at 1333.22–13332.2 Pa of less than or equal to (0.824 lnP+0.47) mW/m·K (TC≦(0.824 lnP+0.47) mW/m·K), preferably less than or equal to (0.825 lnP+0.16) mW/m·K (TC≦(0.825 lnP+0.16) mW/m·K).

In formulas utilized herein "ln" refers to the natural log ($\log_e 1 = \ln 1 = 0$).

Figure 1:
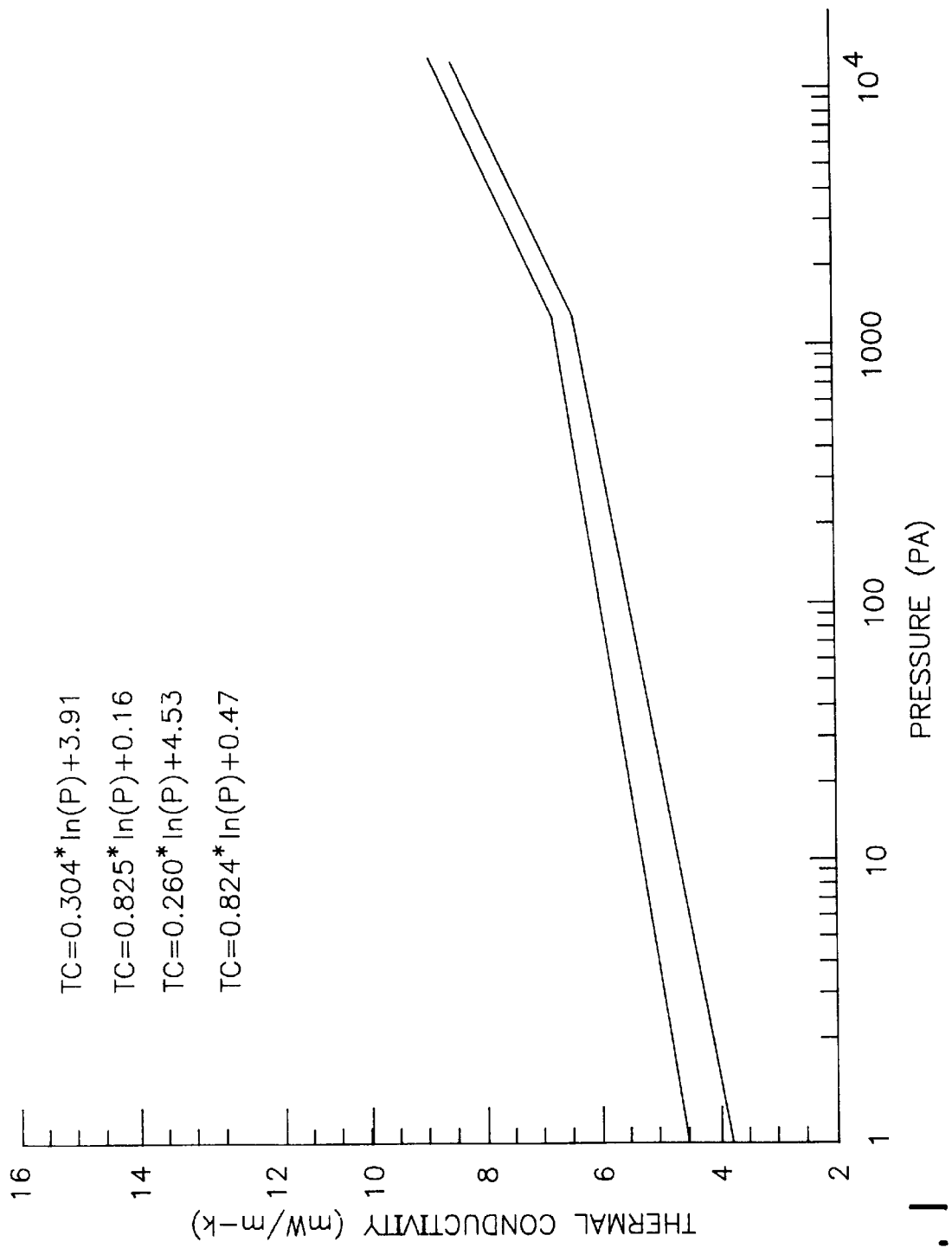
FIG. 1 provides a graphical depiction of the formulas utilized in the description of the present invention.

FIG. 1 provides a graphical depiction of the formulas utilized herein in describing compositions of the present invention. The upper curves in FIG. 1 represent TC=(0.260 lnP+4.53) mW/m·K at 133.322–1333.22 Pa and TC=(0.824 lnP+0.47) mW/m·K at 1333.22–13332.2 Pa. The lower curves in FIG. 1 represent TC=(0.304 lnP+3.91) mW/m·K at 133.322–1333.22 Pa and TC=(0.825 lnP+0.16) mW/m·K at 1333.22–13332.2 Pa.

In accordance with one aspect of the present invention there is provided a particulate composition which under a 103421 Pa load, at 20° C., and at a pressure of 133.322 Pa (1 Torr), in Nitrogen, has:

- a packing density of less than or equal to 160 kg/m$^3$, preferably less than or equal to 140 kg/m$^3$, more preferably 10–120 kg/m$^3$ and
- a TC of less than or equal to 5.8 mW/m·K, preferably less than or equal to 5.4 mW/m·K.

In accordance with another aspect of the present invention there is provided a particulate composition which under a 103421 Pa load, at 20° C., and at a pressure of 1333.22 Pa (10 Torr), in Nitrogen, has:

- a packing density of less than or equal to 160 kg/m$^3$, preferably less than or equal to 140 kg/m3, more preferably 10–120 kg/m$^3$ and
- a TC of less than or equal to 6.4 mW/m·K, preferably less than or equal to 6.1 mW/m·K.

In accordance with a further aspect of the present invention there is provided a particulate composition which under a 103421 Pa load, at 20° C., and at a pressure of 13332.2 Pa (100 Torr), in Nitrogen, has:

- a packing density of less than or equal to 160 kg/m$^3$, preferably less than or equal to 140 kg/m$^3$, more preferably 10–120 kg/m$^3$ and
- a TC of less than or equal to 9 mW/m·K, preferably less than or equal to 8 mW/m·K.

In accordance with a further aspect of the present invention there is provided a particulate composition which under 103421 Pa (15 psi) load, at 20° C., and at any pressure (P) range of 133.322–13332.2 Pa (1–100 Torr), in Nitrogen, has:

- a packing density of less than or equal to 160 kg/m$^3$, preferably less than or equal to 140 kg/m$^3$, more preferably 10–120 kg/ m$^3$ and
- a Thermal Conductivity (TC) at 133.322–1333.22 Pa of less than or equal to (0.260 lnP+4.53) milliwatt/meterK (mW/m·K) (TC≦(0.260 lnP+4.53) mW/M·K), preferably less than or equal to (0.304 lnP+3.91) mW/m·K (TC≦(0.304 lnP+3.91) mW/m·K) and a TC at 1333.22–13332.2 Pa of less than or equal to (0.824 lnP+0.47) mW/m·K (TC≦(0.824 lnP+0.47) mW/m·K), preferably less than or equal to (0.825 lnP+0.16) mW/m·K (TC≦(0.825 lnP+0.16) mW/m·K).

The foregoing description of the compositions of the present invention is provided with reference to selected pressures, including pressures within the range of 133.322–13332.2 Pa (1–100 Torr). The selected pressure refers to the pressure within the vacuum chamber utilized in determining the TC of the composition.

The compositions of the present invention may be advantageously utilized as an insulation material to reduce heat transmission in insulation applications which include, but are not limited to panels (e.g. powder in vacuum panels), blankets, walls, housings and the like.

The compositions of the present invention are particularly advantageous for use as an insulating material in a structure under vacuum, for example in a vacuum bag, such as those utilized in vacuum panels.

Thermal conductivity ("TC") is a measure of the thermal insulating capabilities of a material. TC may be expressed as milliwatt per meter K (mW/m·K) in SI units and as (BTU) (inch) per (hour)(square feet)(°F.) in English units. Greater numerical values of TC correspond to greater thermal conductivity and lower insulating ability. Lower numerical values of thermal conductivity correspond to greater insulating ability.

TC is the inverse of thermal resistivity. Thermal resistivity may be reported as (meter)(K)/milliWatt in SI units and as (hour)(square feet)(°F.) per (BTU)(inch) in English units, often commonly referred to R-Value/inch. Greater numerical values of thermal resistivity correspond to greater insulating ability, and thus lower TC.

The TC values described and reported herein may be easily converted to thermal resistivity values utilizing the following formula: thermal resistivity=1/TC.

For a porous particulate composition TC may vary as a function of the environmental conditions, such as the atmosphere, temperature and pressure which surround and/ or fills the pores. For example, in insulation wherein an insulating composition is under vacuum, TC will be affected by the degree of vacuum established and maintained.

More details relating to TC are set forth in ASTM Terminology Standard C-168. The Thermal Conductivity (TC) values reported herein were determined in the manner known in the art utilizing ASTM Test Procedure C1114-92. More details relating to the procedure for determining TC are set forth below.

Packing density refers to the mass or weight of the composition divided by its volume. The mass or weight of the composition, and its volume may be determined utilizing conventional techniques.

The utility of an insulating composition will depend in part on its density at a desired TC. Denser compositions would require that more material be used to achieve a desired degree of insulation. Generally, the use of more material will result in higher cost.

The insulation properties of the composition of the present invention are described with reference to the composition being under an external load of 103421 Pa (15 psi). The 103421 Pa (15 psi) load may be obtained by compressing the composition utilizing known techniques. These techniques include the following: transferring the composition into a pouch, sealing the pouch, and placing the pouch between two metal plates and compressing uniaxially without edge constraint to an external load of 103421 Pa (15 psi). Compression is maintained for the TC measurement.

The temperature of 20° C., as used in the descriptions of the compositions of the present invention, refers to the temperature at which the TC measurement is conducted.

As used in the description of the present invention "Nitrogen" refers to a gaseous atmosphere comprising nitrogen as a major ingredient. The properties of the composition of the present invention are described with reference to nitrogen as the gas in the pores and surrounding the composition of the present invention. The reference to nitrogen in the description of the present invention provides a means for comparing the TC of the composition of the present invention to the TC of other compositions. However, in embodiments of the composition of the present invention the surrounding atmosphere may comprise air, nitrogen, or a gas with a different thermal conductivity, for example, Argon, Krypton or Xenon which have lower thermal conductivities.

Preferred embodiments of compositions of the present invention have a BET surface area of greater than or equal to 200 m$^2$/g, preferably greater than or equal to 400 m$^2$/g, more preferably greater than or equal to 500 m$^2$/g. BET surface area may be determined utilizing ASTM test procedure D1993.

In preferred embodiments of compositions of the present invention the size, and size distribution, of the intergranular spaces between the particles, are minimized by utilizing a composition comprising particles having an average particle size of between 50–500 microns, preferably between 50–250 microns. These particle sizes may be achieved by conventional techniques, for example milling and/or physical separation techniques.

Preferred embodiments of compositions of the present invention are compositions with a porosity of greater than or equal to 0.90, more preferably greater than or equal to 0.93. Porosity is defined as the fraction of the sample volume that is pores, both in and around the particulate material and may be determined by the following formula:

$$\text{Porosity} = 1 - \frac{\text{(measured rod density in porous form)}}{\text{(density of the material in solid form)}}$$

More details relating to the measurement of porosity are provided below.

A preferred composition of the present invention is a gel composition comprising a gel component.

As used herein gel compositions include, but are not limited to aerogels, xerogels and the like produced with or without supercritical drying.

Among the gel components suitable for use in the composition of the present invention are included: oxide gels, including metal oxide gels such as silica gels, titania gels, alumina gels and the like; polymeric gels, such as resorcinol-formaldehyde (R-F) gels, melamine formaldehyde (M-F) gels, phenol-furfural (P-F) gels and the like. The preferred gel component is a metal oxide gel. A detailed description of "gels" and "gel components" is set forth in published PCT application 96/18456 the disclosure of which is hereby incorporated herein by reference. Preferably the gel component is a silica aerogel, more preferably a silica aerogel produced from a sodium silicate precursor.

Also preferred is a gel composition which includes an opacifying agent.

Suitable opacifying agents include those which will minimize the travel of IR radiation through the composition and include, but are not limited to carbonaceous materials, iron oxides, $Al_2O_3$, $FeTiO_3$, $TiO_2$, $ZrO_2$ and other opacifying agents known in the art. A preferred opacifying agent comprises a carbonaceous material. Carbonaceous materials include: carbon black; activated carbon; graphite; composites comprising carbon black and metal oxide (e.g. silica); and blends including such carbonaceous filler materials. More preferably the opacifying agent is a carbon black. A preferred carbon black has a nitrogen surface area ($N_2SA$) of at least 10 m$^2$/g, preferably 15 to 500 m$^2$/g.

In a preferred embodiment of a composition of the present invention, the composition comprises greater than or equal to 3%, preferably greater than or equal to 5%, more preferably 5 to 30%, by weight, opacifying agent.

The opacifying agent may be combined with the gel component in a variety of manners. The opacifying agent may be physically mixed in dry form with the gel component after drying. Preferably the opacifying agent is encapsulated within the matrix of the gel component, for example by combining the opacifying agent with the gel component prior to gelation of the gel component.

To improve handling of the gel composition, the opacifying agent is preferably attached to the gel component. Details relating to the meaning of the term "attached" as used herein, are set forth in published PCT application WO96/18456 referenced above. As set forth in published PCT application WO96/18456, a Scanning Electron Microscope (SEM) image of a gel composition comprising an attached opacifying agent, in particular an attached carbonaceous component, differs from the SEM image of a composition wherein the gel component and the opacifying agent are physically mixed, or a composition wherein the opacifying agent is encapsulated within, but not attached to, the gel matrix of the gel component. In addition, the Rub-Off value of a gel composition comprising an attached opacifying agent, in particular an attached carbonaceous component, will generally be less than the Rub-Off value of a composition wherein the gel component and the opacifying agent are physically mixed, or a composition wherein the opacifying agent is encapsulated within, but not attached to, the gel matrix of the gel component.

If desired, the opacifying agent may be treated, for example with chemical treating agents, to render the opacifying agent attachable to the gel component. As explained in PCT published application WO96/18456 carbonaceous materials, in particular carbon blacks, may be treated in the following manner to render the carbonaceous material attachable to the gel component.

An attachable carbonaceous component may be prepared by reacting a carbonaceous component with a diazonium salt in a liquid reaction medium to attach at least one organic group to the surface of the carbonaceous component. Preferred reaction media include water, any medium containing water, and any medium containing alcohol. Water is the most preferred medium.

Modified carbonaceous components and various methods for their preparation are described in: published PCT application WO96/18456, entitled "Gel Compositions"; published PCT application WO96/18688 entitled "Reaction of Carbon Black with Diazonium Salts, Resultant Carbon Black Products and Their Uses"; and published PCT application WO96/18690 entitled "Reaction of Carbon Materials with Diazonium Salts and Resultant Carbon Products". The disclosure of each of these published PCT applications is hereby incorporated herein by reference.

A method of preparing attachable carbonaceous components, for use in the gel compositions of the present invention, is described in the following paragraph with reference to carbon black as the carbonaceous component. Similar methods could be performed to prepare attachable carbonaceous components other than carbon black.

To prepare attachable carbon black, the diazonium salt need only be sufficiently stable to allow reaction with the carbon black. Thus, that reaction can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology.

A set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the $C_1$–$C_{12}$ alkyl group of the organic group is directly attached to the carbon black. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include –COOH, —$SO_3H$ and —$PO_3H_2$, and their salts, for example —COONa, —COOK, —COO—$NR_{4+}$, —$SO_3Na$, —$HPO_3Na$, —$SO_3^-$ $NR_{4+}$, and $PO_3Na_2$, where R is an alkyl or phenyl group. Particularly preferred ionizable substituents are —COOH and —$SO_3H$ and their sodium and potassium salts.

Most preferably, the organic group is a substituted or unsubstituted sulfophenyl group or a salt thereof; a substituted or unsubstituted (polysulfo) phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion are p-sulfophenyl, 4-hydroxy-3-sulfophenyl, and 2-sulfoethyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—$NR^{3+}$) and quaternary phosphonium groups (—$PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and quaternized aromatic amines, can also be used as the organic group. Thus, N-substituted pyridinium compounds, such as N-methyl-pyridyl, can be used in this regard.

It is also possible to create an opacified gel by utilizing a gel precursor with inherent opacity, or by chemically modifying the surface of a gel or gel precursor. The chemical modification may be accomplished, for example, by attaching an organic composition to the surface of the gel and pyrolyzing the non-carbon constituents of the organic composition to opacify the gel.

A preferred composition of the present invention may be produced by conventional processes for producing gel compositions, for example conventional sol-gel processing. In particular the gel compositions may be produced by the processes disclosed in the Examples herein and the Examples in the referenced applications and their microstructure may be tailored to optimize properties desired for specific applications. Various precursors, including metal alkoxides, colloidal suspensions, and combinations thereof may be utilized with a variety of mechanisms of gelation to synthesize compositions of the present invention. By varying processing conditions, such as time, temperature, pH, and pore fluid, the microstructure of the composition may be altered.

As explained in detail in the Examples set forth below, gel compositions of the present invention may be produced from a solution comprising gel precursor solids. A gel composition of the present invention with a TC and packing density under load falling within the present claims may be produced from a solution with a solids percentage by weight sufficiently low to achieve the desired packing density and by processing the solution, utilizing sol-gel processing techniques, in a manner wherein a low solids concentration is maintained in the final gel composition.

In particular, a gel composition of the present invention may be produced by the following method:

1) initiating gelation, for example through the use of a catalyst, in a solution comprising the gel precursor solids, or the gel precursor and opacifying agent, at an initial solids concentration to achieve the desired solids concentration in the final gel composition;

2) allowing gelation to proceed to a predetermined degree of completion;

3) if desired, aging the gel at a temperature, and for a period of time sufficient to achieve the mechanical characteristics desired in the final gel composition;

4) if desired, washing the gel;

5) if desired, exchanging the pore fluid 6) if desired, chemically treating the gel; and 7) removing liquid from the resulting gel composition, for example by drying.

Individual process steps 3, 4, 5 and/or 6, if utilized, may be performed in any order, and may be repeated to achieve gel compositions with desirable characteristics.

In a preferred method a composition of the present invention may be produced from a gel precursor by a process comprising:

initiating gelation in a solution comprising gel precursor solids and allowing gelation to proceed to a predetermined degree of completion;

contacting the initial gel with a surface modification agent and removing liquid from the resulting gel to form the gel composition.

The process for producing a surface modified gel composition from a gel precursor may further include one or more of the following steps:

aging the initial gel at a temperature, and for a period of time sufficient to achieve the mechanical characteristics desired in the final gel composition prior to contact with the surface modification agent;

washing the initial gel prior to contact with the surface modification agent;

aging the resulting gel at a temperature, and for a period of time sufficient to achieve the mechanical characteristics desired in the final gel composition after contact with the surface modification agent;

exchanging pore fluid in the resulting gel prior to contact with the surface modification agent;

exchanging pore fluid in the resulting gel after contact with the surface modification agent; and/or washing the gel after contact with the surface modification agent.

In addition, if other ingredients, such as opacifying agents and the like are desired in the final gel composition, these ingredients may be added to the solution prior to the initiation of gelation.

In a preferred method of producing compositions of the present invention the solids concentration of the solution is chosen such that the solids concentration of the resulting gel composition is less than or equal to 8%, preferably less than or equal to 7%, to achieve the packing densities desired for the compositions of the present invention.

One example of a preferred method of producing gel compositions, which may be utilized to produce compositions of the present invention, is described in published PCT application WO94/25149, assigned to the University of New Mexico, the disclosure of which is hereby incorporated herein by reference. In the method described in WO94/25149 the internal pore surface of a wet gel, for example an alkoxide-derived silica gel, is reacted before drying with an organic surface modification agent comprising the formula $R_xMX_y$, where R is an organic group, M is Si or Al and X is a halogen, e.g. trimethylchlorosilane $((CH_3)_3SiCl)$, so that significant changes in the subsequent drying of the gels at non-supercritical pressures are obtained which leads to greatly reduced shrinkage during drying.

Gel precursors include but are not limited to oxide, polymeric and particulate gel precursors known in the art, such as:

|  | Form(s) as Gel Precursor |
| --- | --- |
| Metal Oxide Gel | |
| $SiO_2$ | Alkoxide, Silicate Compositions, Colloidal, Pyrogenic |
| $TiO_2$ | Alkoxide, Colloidal, Pryogenic, Titanate Compositions, Titanium Halides |
| $Al_2O_3$ | Alkoxides, Colloidal, Aluminate Compositions, Salts, Pyrogenic, Aluminum Halides |
| $ZrO_2$ | Alkoxides, Colloidal, Zirconate Compositions, Salts, Pyrogenic, Zirconium Halides |
| Polymeric Gel | |
| resorcinol-formaldehyde (R-F) | polyhydroxy benzenes (e.g. resorcinol) and formaldehyde |
| melamine-formaldehyde (M-F) | melamine and formaldehyde, functionalized melamine-formaldehyde resins |
| phenol-furfural (P-F) | phenol and furfural |

The choice of a particular precursor is made based on the type of composition desired. Preferably the gel component of the composition of the present invention is produced from a sodium silicate precursor.

The opacifying agent utilized in the composition of the present invention is preferably added during preparation of the gel. More particularly, the opacifying agent may be predispersed in the sol precursor to the gel at a stable pH and then the pH adjusted to promote gelation. The preferred result is a composition wherein the opacifying agent is attached to the gel component, or encapsulated within the gel matrix. As discussed above, use of an attachable opacifying agent is preferred to achieve a gel composition wherein an opacifying agent is attached to a gel component.

Further details relating to the production of compositions of the present invention are provided in the Examples described herein.

In accordance with an additional aspect of the present invention there is provided an insulation body comprising a particulate composition of the present invention. The insulation body may further comprise a barrier, film, structure, membrane or other means for restraining and/or enclosing the particulate composition of the present invention. In addition, a particulate composition of the present invention may be added as a component of a composition which is foamed, extruded, molded or otherwise formed into a definable volume.

Potential embodiments of an insulation body of the present invention include but are not limited to insulating structures. The term structure is utilized to refer to any enclosed space, which may or may not be evacuated (under vacuum), which may be filled, or partially filled, with an a particulate composition of the present invention. Such structures include, but are not limited to panels, blankets, walls, housings and the like. An insulation body of the present invention may be utilized in any structural shape designed to insulate a system.

A preferred embodiment of an insulation body of the present invention is a vacuum insulation panel. The vacuum insulation panel comprises a particulate composition of the present invention under vacuum and a subtantially gas impermeable barrier surrounding the composition. The insulating structure embodiments of the present invention may further include additional structural elements and/or surfaces treated to achieve very low emissivity; radiation shields and/or the like.

Figure 2:
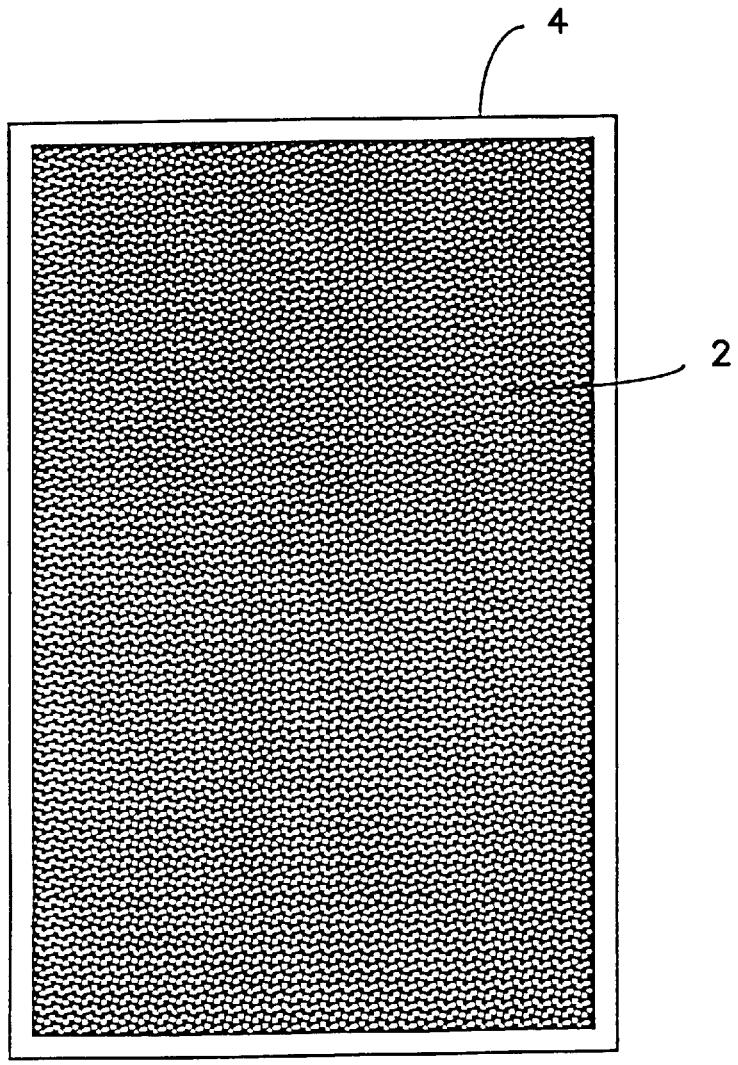
FIG. 2 depicts a vacuum insulation panel embodiment of an insulation body of the present invention.

An embodiment of an insulation body of the present invention is depicted in FIG. 2 which illustrates, a particulate composition of the present invention 2, enclosed within vacuum bag, 4 which is substantially gas impermeable. Substantially gas impermeable barriers suitable for use in the present invention include: enclosures, such as envelopes or pouches, including metal barriers, barrier films comprising one or more layers of polymeric, metallized polymeric, or metal foil laminates which are substantially impermeable to gas.

In non-vacuum applications, wherein a particulate composition of the present invention is not contained within an evacuated enclosure, other means for creating a definable volume of said particulate composition of the present invention may be employed. In general terms, in non-vacuum applications, a particulate composition of the present invention may be enclosed within, or surrounded by a barrier, sufficient to contain substantially all of a particulate composition of the present invention within a desired space. Suitable barrier materials for non-vacuum applications include, but are not limited to, plastics, cellulose materials, wood, cement, asphalt and/or metal.

Alternatively, a particulate composition of the present invention may be added as a component to a composition which is foamed, extruded, molded or otherwise formed into a definable volume. For example a particulate composition of the present invention may be added as a component to a styrofoam composition which is then formed into bricks. The composition including a particulate composition of the present invention may also be further enclosed if desired.

An insulation body of the present invention may be produced by conventional techniques known in the art, such as those described below with reference to a vacuum insulation panel embodiment of the present invention. Other embodiments of the present invention may likewise be produced utilizing conventional techniques well known in the art.

A vacuum insulation panel embodiment of the present invention may be produced by placing a particulate composition of the present invention within a substantially gas impermeable barrier enclosure then evacuating and sealing the enclosure. Optionally, the particulate composition of the present invention may be dried prior to placement in the barrier enclosure.

If desired, a particulate composition of the present invention may be placed in a porous pouch and pressed to a desired shape prior to placement in the substantially gas impermeable and substantially water impermeable membrane enclosure. A particulate composition of the present invention may also be placed in the porous pouch prior to drying, if a drying step is utilized, to aid in holding the particulate composition of the present invention during the drying and/or pressing operations. Suitable porous pouches include those formed from any material which allows the passage of air and moisture but holds the particulate composition of the present invention, which may be a finely divided particulate mixture. Examples of suitable porous pouches include porous pouches comprising and formed from polypropylene, for example, TYVEK® polypropylene produced and sold by of E. I. DuPont de Nemours Company, Wilmington, Del. and CELGARD polypropylene produced and sold by Celanese Corporation, and porous pouches formed from paper of the type utilized as filter paper.

In the optional drying operation, whether or not the porous pouch is employed, the drying temperature should be sufficient to drive off any surface water from the a particulate composition of the present invention. Generally, the drying temperature will be at least 100° C., the upper limit being a temperature at which neither the particulate composition of the present invention or the porous pouch, if utilized, will degrade.

The dried, pressed particulate composition of the present invention may then be placed into a substantially gas impermeable barrier enclosure, formed in such a way as to prevent gas leakage. If the particulate composition of the present invention has been dried in a porous pouch, the porous pouch is merely placed into the membrane enclosure. Generally the barrier enclosure is filled with an amount of a particulate composition of the present invention sufficient to result in a substantially completely filled enclosure after evacuation. As will be understood by those of ordinary skill in the art, the evacuation process will generally cause the barrier enclosure to shrink to fit around the a particulate composition of the present invention.

It should be noted that the TC of a vacuum panel structure comprising a composition of the present invention may be different than the TC of the composition of the present invention alone measured by the techniques described herein, for example due to the conductivity of the plastic film utilized in the vacuum panel.

A vacuum insulation structure of the present invention may have any dimensions depending on the desired end use. Generally however, the vacuum insulation panel structure of the present invention will have a length, width and thickness sufficient to substantially fill the space where it is to be utilized. For appliance applications, e.g. refrigerators or freezers, the length, width and thickness will vary depending on the size of the appliance, however the thickness of the vacuum insulation panel structure will generally be 3 to 50 millimeters.

Preferably the overall properties of the gas impermeable barrier enclosure shall permit it to survive handling without puncture or other damage. In general, the overall thickness of enclosures suitable for creating a definable volume of a particulate composition of the present invention will range from approximately 50 to 1000 microns. While the thinner materials provide sufficient strength to hold the a particulate composition of the present invention and allow the further processing necessary, the life expectancy of the apparatus into which they are placed may be reduced.

Generally, the substantially gas impermeable barrier enclosure which is employed in the vacuum insulation structure embodiment of the present invention has one or more opening(s) permitting the evacuation of the enclosure and, if desired, the refilling of the enclosure with insulating gases. The bag is first evacuated to as a low a pressure as desired, for example, 133.322–1333.22 Pa (1–10 Torr.) The evacuation cycle can be repeated so as to assure a low air partial pressure remaining in the panel. The manufacturing process is then terminated by heat sealing the enclosure to close the evacuation path.

An insulation body of the present invention may be advantageously utilized as a thermal insulation medium in a refrigeration appliance such as a refrigerator, freezer, cooler or the like.

The effectiveness and advantages of various aspects and embodiments of the present invention will be further illustrated by the following examples. The experimental results set forth below illustrate that TC provides a means to distinguish the physical characteristics of different compositions. The physical characteristics, such as pore size, pore size distribution, surface area and structure of compositions such as gels are difficult to measure due to the fragility of the composition. Traditional tests for physical characteristics such as pore size may yield inaccurate results, if any, due to deformation and/or breakage of the gel. In contrast, TC may be accurately determined with less risk of deformation or breakage of a gel.

The absence of convection, heat transfer occurs through gas phase conduction, solid phase conduction and radiation. As illustrated in the Examples below a composition's TC will depend on the physical characteristics of the composition, including, for example particle size, density, opacity, the type and presence of opacifying agent(s) and porosity. However changes made to any individual property of the composition to reduce at least one mode of heat transfer may increase one or more other modes of heat transfer to an undesirable extent.

As illustrated in the Examples, attributes of compositions of the present invention may be modified to produce advantageous TC and packing density under load.

The following testing procedures were utilized in the Examples.

Thermal Conductivity (TC) and Packing Density

Figure 3:
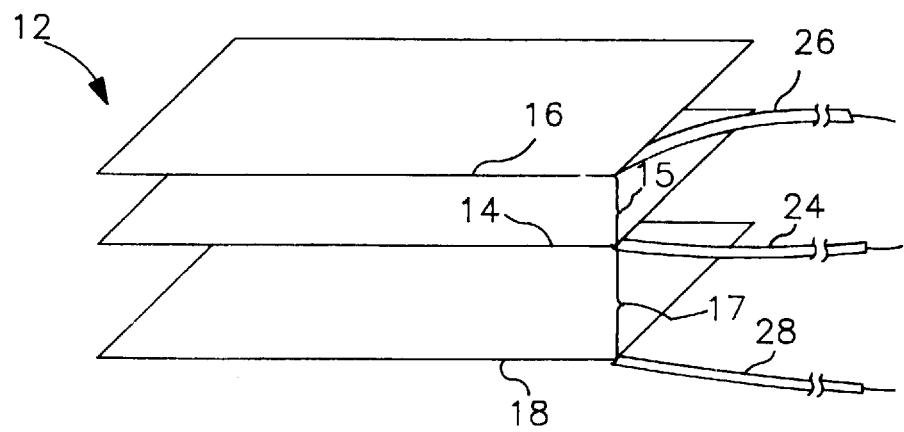
FIG. 3 depicts an embodiment of an apparatus utilized in analyzing Thermal Conductivity.
Figure 4:
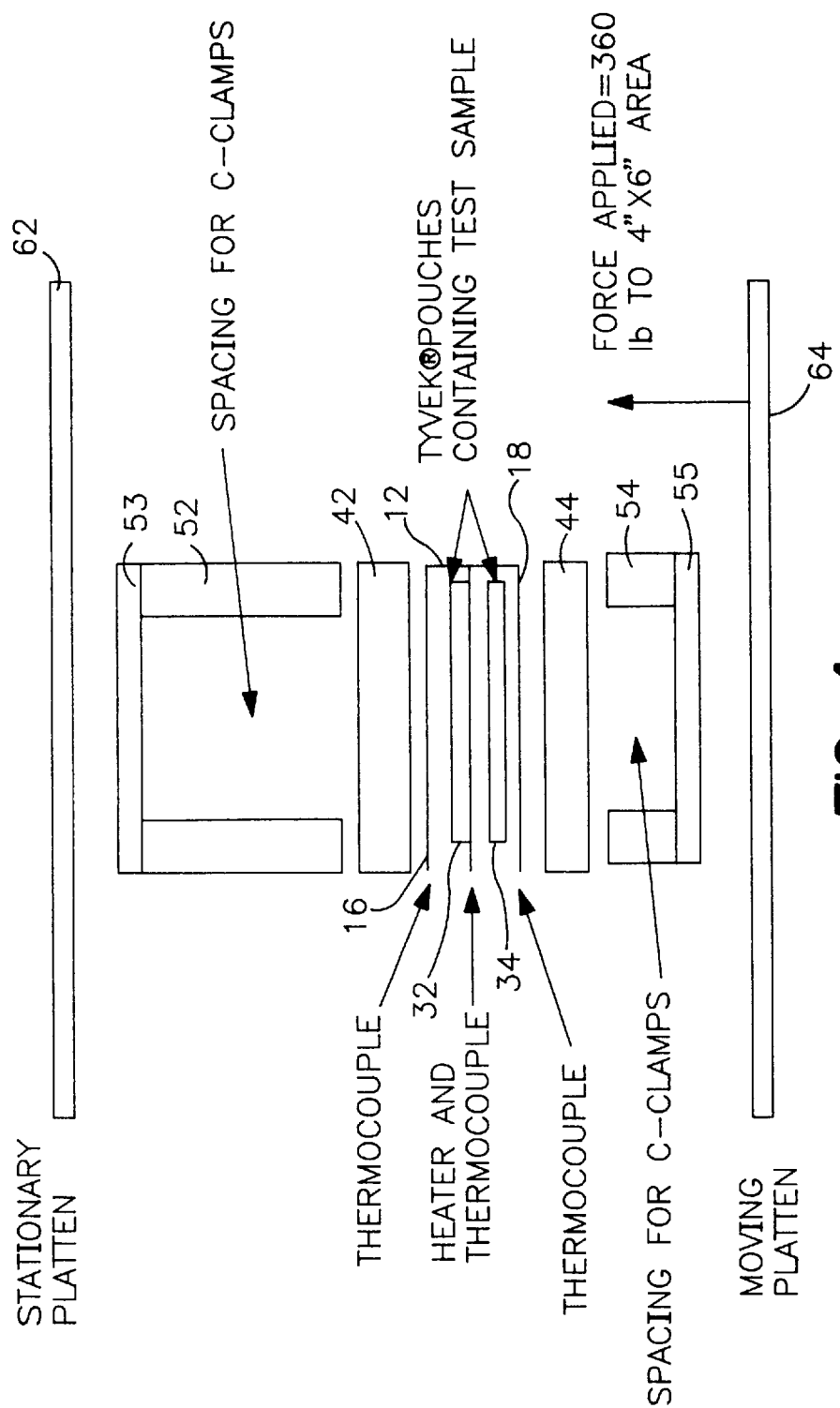
FIG. 4 depicts an embodiment of an apparatus for placing a composition under a 103421 Pascals (Pa) load for determining packing density and TC under load.

The Thermal Conductivity (TC) under load of the compositions is measured according to ASTM Test Procedure C1114-92 utilizing the procedures and equipment described below and illustrated in FIGS. 3 and 4. The packing density of the compositions is measured by the technique set forth below.

1. Approximately 200–300 cubic centimeters (tap volume) of a sample of the composition is dried in an oven at 120° C. for a minimum of 2 hours until substantially completely dry. The amount of composition utilized is sufficient to completely fill two 4 inch (102 mm) by 6 inch (152 mm) by 0.25 inch (6 mm) TYVEK® pouches as described in the following steps. TYVEK® is a registered trademark for fibers of E. I. DuPont de Nemours Company, Wilmington, Del. The actual volume of powder may vary but will be accounted for in measurement of TC under load.

2. The composition sample is divided into 2 equal portions by weight and the weight of each portion is recorded.

3. Each portion of the composition sample is placed into a 4 inch (102 mm) by 6 inch (152 mm) by 0.25 inch (6 mm) TYVEK® pouch.

4. Each pouch is sealed with adhesive to produce 2 substantially similar pouches. The pouches are stored in a desiccator while the adhesive dries.

5. After the adhesive dries the pouches are placed among the plates of a thin foil heater apparatus 12 illustrated in FIG. 3. As shown in FIG. 3, thin foil heater apparatus 12 comprises heater and thermocouple plate 14, and thermocouple plates 16 and 18. The plates are joined by flexible couplings 15 and 17 which comprise tape. Electrical wires 24, 26 and 28 extend from plates 14, 16 and 18 respectively and include connector means on their ends for connecting the thin foil heater apparatus to a heating and measuring device.

6. The thin foil heater apparatus with pouches is then assembled in the load device depicted in FIG. 4. Thin foil heater apparatus 12, with pouches 32 and 34 is placed between aluminum blocks 42 and 44 which are greater in surface area than the pouches and sufficient thickness to resist deformation under load. Additional aluminum pieces 52 and 54 which substantially planar surfaces 53 and 55 respectively sufficient spaced from aluminum blocks 42 and 44 to allow room for clamping means such as C-Clamps to be placed around the aluminum blocks 42 and 44.

7. The assembled load device from step 6 (FIG. 4) is placed in a Carver, Model C press comprising stationary platen 62 and moving platen 64 depicted in FIG. 4.

8. Moving platen 64 is moved towards the stationary platen 62 with the assembled load device in between until 1601.28 Newtons (360 pounds) of force is acting on the pouches which is 103421 Pa (15 pounds per square inch for the 4 inch by 6 inch pouch).

9. C-clamps are placed around the aluminum plates 42 and 44 are tightened sufficiently to maintain the pressure applied by the press. The press is then released.

10. The distance between thermocouple sheets 14 and 16, and the distance between thermocouple sheets 16 and 18 is measured at all four corners to determine the thickness of each pouch under the 103421 Pa (15 psi) load. The packing density of the composition sample is calculated from the thickness of the sample determined in step 10, the weight (mass) of the sample determined in step 2 and the area of the sample which is taken to be 15504 square mm (102 mm×152 mm) (24 square inches (4 inches×6 inches)) according to the formula: Packing Density=Mass/(Thickness×Area).

11. The load device, with the composition samples under load are then placed in a pressure vessel which is evacuated, and then backfilled with nitrogen to obtain the TC measurements at the selected pressures of 133.322–13332.2 Pa (1–100 Torr).

12. TC measurements are obtained by connecting the electrical leads from the thin foil heater apparatus to a power source and a nanovoltmeter which is utilized to calculate the temperature difference. TC is calculated from the temperature difference and the power utilized.

In the above procedure, the TC of the compositions is determined in a Nitrogen atmosphere at ambient temperature of between 17°–25° C. The TC of the compositions of the present invention will be substantially equivalent if measured in atmospheric air or other mixtures (or solutions) of gases having thermal conductivities similar to the thermal conductivity of Nitrogen. The TC of the composition of the present invention may be determined with reference to atmospheric air, or a gas with a similar conductivity, as the gas which surrounds and fills the pores of the compositions and spaces within the volume of the composition being analyzed. The TC of the composition of the present invention will generally decrease in an atmosphere of a gas which has lower conductivity than Nitrogen.

While the measurements were obtained at ambient temperature at the time of measurement, no substantial variation of TC would be expected over the range of 17°–25° C.

The measurement of TC under load provides information on a composition's performance in insulation applications where the composition will be under an external load, for example in insulation panels having reduced internal pressures.

Particle Size

Particle size of the compositions is determined by physical separation techniques utilizing 1 mm (18 mesh), 500 µm (35 mesh), 250 µm (60 mesh) and 90 µm (170 mesh) screens. A CSC Scientific Sieve Shaker, model 18480 is utilized in the separation.

Porosity

The porosity of the gel compositions may be determined by determining the rod density of the composition and calculating the porosity by the following method.

To determine rod density, a gel is cast and formed in cylindrical molds. The total gel volume is determined by physically measuring the dimensions of a dry gel. The bulk density is determined by weighing the dry gel and dividing by the geometric volume. In instances where a rod like geometry is not maintained or, as a verification of the above method, mercury displacement is employed.

The rod density of gel compositions measured by mercury displacement is carried out as follows. A clean empty glass cell is filled with mercury to a specific height and the cell is weighed. The mercury is then removed and the cell is cleaned again. Next, a dry gel sample of known weight is placed in the glass cell and mercury is added to the cell to the same specific height as before. The weight of the cell containing mercury and the sample is measured. The weight of mercury in both cases is then converted to a volume based on the density of mercury. The difference between the volume of mercury which fills an empty cell and the volume of mercury which fills the cell containing a sample is known as the displaced volume. Since mercury does not wet the sample this volume is equal to the total volume of the sample. The density is then determined by dividing the weight of the sample by the displaced volume.

Porosity is defined as the fraction of the sample volume that is pores, both in and around the particulate material and may be determined by the following formula:

$$\text{Porosity} = 1 - \frac{\text{(measured rod density in porous form)}}{\text{(density of the material in solid form)}}$$

The density of a solid mass of the material is determined with reference to the composition of the material. In the case of a silica gel composition, without opacifying agents, the density of the solid mass of material is assumed to be the density of a solid mass of silica which is 2.2 g/cc (220 kg/m3). In the case of a gel composition which includes opacifying agents, the density of the solid mass of material is assumed to be a weighted average of the densities of each component. For example, in the case of a gel composition comprising a silica gel precursor and a carbon black of pacifying agent, the density of the solid mass of material is assumed to be a weighted average of the density of a solid mass of silica (2.2 g/cc) and the density of a solid mass of carbon black (1.8 g/cc).

Carbon Black Analyticals

The nitrogen surface area ($N_2$SA) of the carbon blacks utilized in the examples, expressed as square meters per gram ($m^2$/g) is determined according to ASTM test procedure D3037 Method A.

The dibutyl phthalate adsorption value (DBP) of the carbon blacks utilized in the examples, expressed as milliliters per 100 grams of carbon black (ml/100 g), is determined according to the procedure set forth in ASTM D2414.

Solution Preparation

Figure 5:
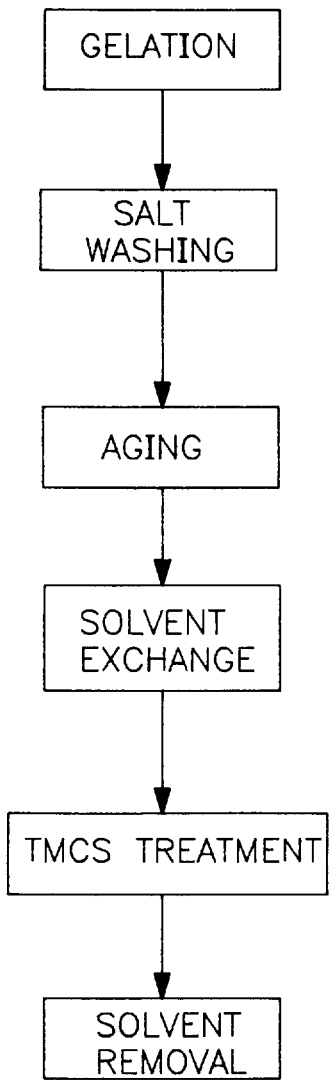
FIG. 5 is a schematic illustration of the example of a process for producing gel compositions described in the Examples herein.

The gel compositions set forth in the examples are prepared in accordance with the basic sol-gel techniques described herein utilizing the steps illustrated schematically in FIG. 5 and described in more detail in the examples.

Three solutions of different sodium silicate concentrations are required for the preparation of the following example aerogels. The sodium silicate comes from a commercially available solution, N® silicate, made by PQ corp., Valley Forge, Pa. The N® silicate has a composition of 8.9% (w/w) $Na_2O$, 28.7% (w/w) $SiO_2$, and 62.4% (w/w) water. The density at 20° C. of N® silicate is 1.38 g/ml.

1) The 5% solution is prepared by adding 72.5 ml of N® silicate to 410 ml of deionized water. This solution is utilized with 2M $H_2SO_4$ in the examples to produce gel compositions having a solids concentration of approximately 5%, by weight.

2) The 8% solution is prepared by adding 72.5 ml of N® silicate to 197 ml of deionized water. This solution is utilized with 2M $H_2SO_4$ in an example to produce a gel composition having a solids concentration of approximately 8%, by weight.

3) The 5%-alternate solution is prepared by adding 72.5 ml of N® silicate to 330 ml of deionized water. This solution is utilized in the preparation of composition P. This solution is utilized with 98% $H_2SO_4$. in the example to produce a gel composition having a solids concentration of approximately 5%, by weight.

Carbon Black Properties

Carbon black CB-A utilized in the following examples is a carbon black produced by Cabot Corporation, Boston, Mass. which has a $N_2$SA of 24 $m^2$/g and a DBP of 132 ml/100 g.

A Modified CB-A carbon black is produced to render the carbon black attachable to a gel component utilizing the following procedure.

Two hundred grams of CB-A is added to a solution of 10.1 g sulfanilic acid and 6.23 g of concentrated nitric acid in 21 g of water. A solution of 4.87 g of $NaNO_2$ in 10 g of water is added to the rapidly stirring mixture. 4-Sulfobenzenediazonium hydroxide inner salt is formed in situ, which reacts with the carbon black. After 15 minutes, the dispersion is dried in an oven at 125 C.

The resulting carbon black product is designated "Modified CB-A" and is a carbon black having attached 4-$C6H4SO_3$- groups.

Carbon black CB-B is MONARCH® 120 carbon black, a trademarked product of Cabot Corporation, Boston, Mass. that has a $N_2$SA of 25 $m^2$/g and a DBP of 64 ml/100 g.

EXAMPLE 1

This example illustrates a process for producing a composition of the present invention. In addition this example compares the Thermal Conductivity (TC) of a composition of the present invention to other compositions.

A gel composition "D" of the present invention is produced utilizing the process steps depicted in FIG. 5.

Further details are as follows.

For the gelation step, the 5% solution described above is utilized.

For approximately 300 ml gel, 42 ml 2M $H_2SO_4$ is dispensed into a jacketed beaker maintained at 20° C. The solution is titrated into the stirred and jacketed vessel at 20° C. The solution addition rate is 1 ml/min. Once a pH of 3 is reached, a Modified CB-A carbon black/water slurry is added and the solution is stirred for several seconds.

The Modified CB-A carbon black/water slurry is prepared by combining 2.79 g of Modified CB-A modified carbon and 53 g of water and sonicating for 2 minutes. The amounts of added carbon black and water are calculated such that the total solids content of the gel remains the same. In this example 15% of the gel composition, by mass, comprises Modified CB-A carbon black.

After addition of the Modified CB-A carbon black/water slurry, the titration is then continued until the pH equals 5. A Corning pH meter, model 320, and a Corning "3 in 1" pH Combination Electrode with automatic temperature compensation (Corning, Inc., Corning, N.Y.) are used to measure the pH.

The sol is then poured into casting containers, approximately 90 ml Teflon® containers. Once the sol gels, the containers are placed into an oven at 50° C. for 15 minutes. After the 50° C. oven treatment, the gel is extruded through a die into 30000μ×3000μ cross-section, square granules.

For the salt washing step, the granules are exchanged with room temperature deionized water 6 times over 5 hours at a volume ratio 6:1 (water:gel).

For the aging step, the excess water is removed and only the pore fluid is retained. The granules are then aged 45 minutes at 80° C.

For the solvent exchange step, the granules are exchanged 5 times with acetone to remove the water. The exchanges are performed with a volume ratio of 6:1 (acetone:gel) for a minimum of 90 minutes for each exchange at room temperature.

A second solvent exchange step is used. The granules are exchanged 5 times with heptane to remove the acetone. The exchanges are performed at a volume ratio of 6:1 (heptane:gel) for a minimum of 90 minutes for each exchange at room temperature.

For the TMCS treatment step, trimethylchlorosilane (TMCS) is added to the gel/heptane mixture at a level of 0.1 g TMCS/g wet gel for overnight. After the treatment, gels are washed twice in heptane to remove any unreacted TMCS.

For the solvent removal step, the granules are placed in a 50° C. oven for 4 hours. Next, the granules are placed in a 80° C. oven overnight, and the final solvent removal step for the granules is 2 hours in a 120° C. oven.

Figure 6:
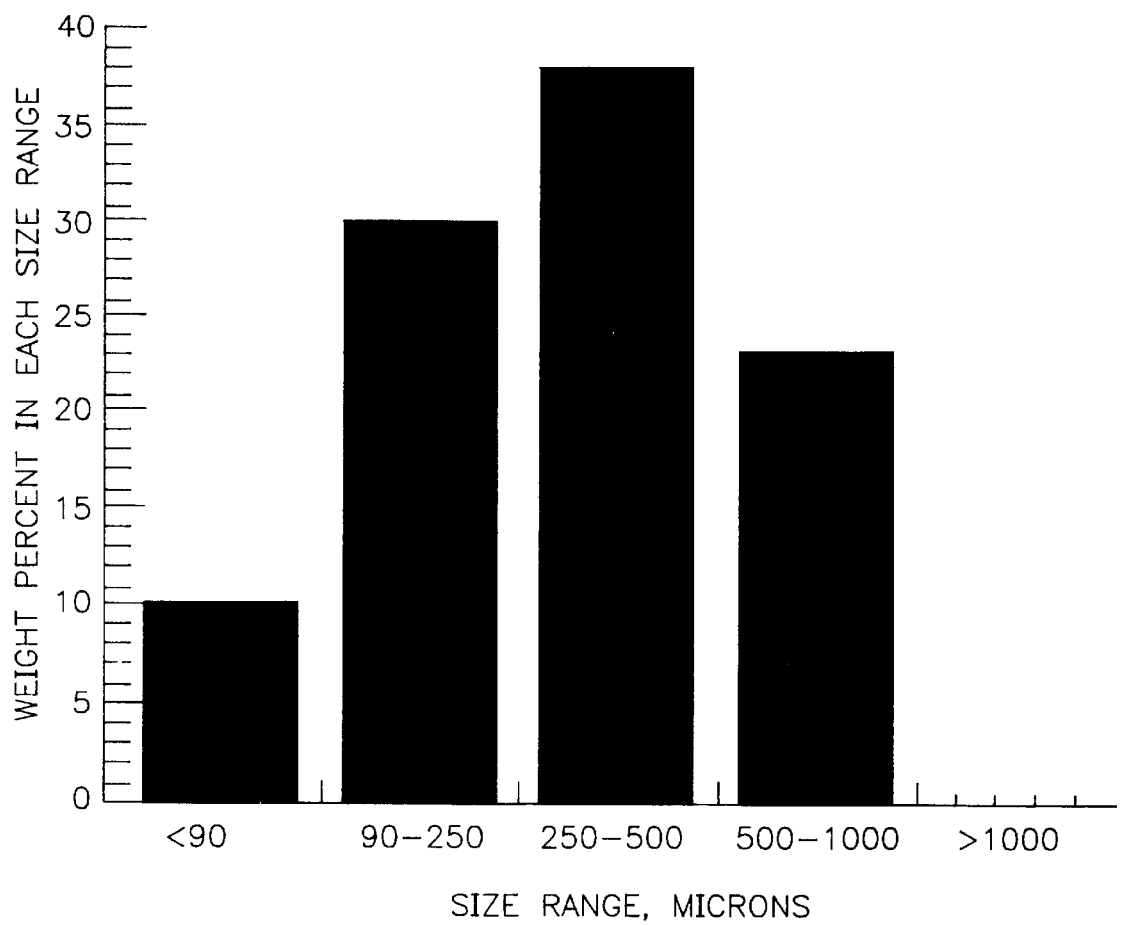
FIG. 6 is a graphical representation of a particle size distribution produced utilizing the laboratory equipment described in the Examples herein.

After the chemical processing is completed, the granules are ground in a coffee grinder (Bunn, GL1). FIG. 6 demonstrates a typical particle size distribution after grinding.

The resulting powder is sieved to separate the 90–250 μm size range of particles (CSC Scientific Sieve Shaker, model 18480, setting 2.5 for 15 minutes)

The 90–250μ gel sample is then prepared for TC measurements according to the procedures set forth above.

The Thermal Conductivity (TC) and packing density under 103421 Pa (15 psi) load of the composition of the present invention, D, and the TC and packing density under 103421 Pa (15 psi) load of four control compositions A, B, C and E are determined utilizing the procedures set forth above. Control composition A is a BASF Basogel® silica aerogel sample, manufactured and sold by BASF, Ludwigshafen, Germany which has a particle size range with all particles being less than 500 μm, and a median size between 50 μm and 150 μm. Control composition B is a Degussa FK500LS® silica aerogel, manufactured and sold by Degussa Akgt., Frankfort, Germany, which has an average particle size of 3 μm. Control composition C is Cabot Cab-O-Sil® EH5, manufactured and sold by Cabot Corporation, Tuscola, Ill., which has an average particle size of 0.2–0.3 μm. Control Composition E is an aerogel granule sample. Control Composition E is prepared in the same manner as composition D of the present invention from gelation through solvent removal. However, Control Composition E remains in the extruded form, approximately 3000μ×3000μ cross-section, granules.

Figure 7:
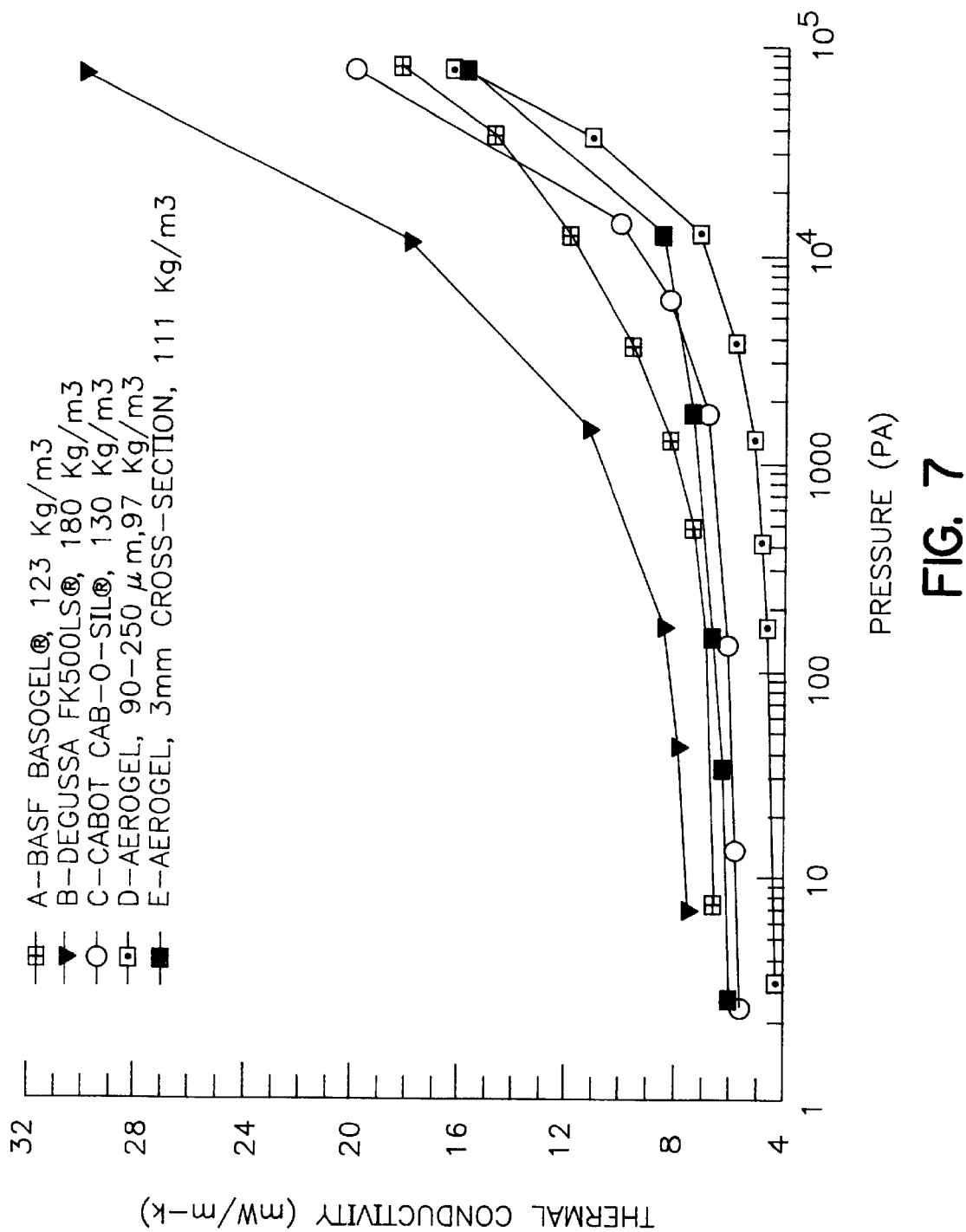
FIG. 7 is a graphical representation of the thermal conductivity (TC) of different materials and is discussed in Example 1 below.
Figure 8:
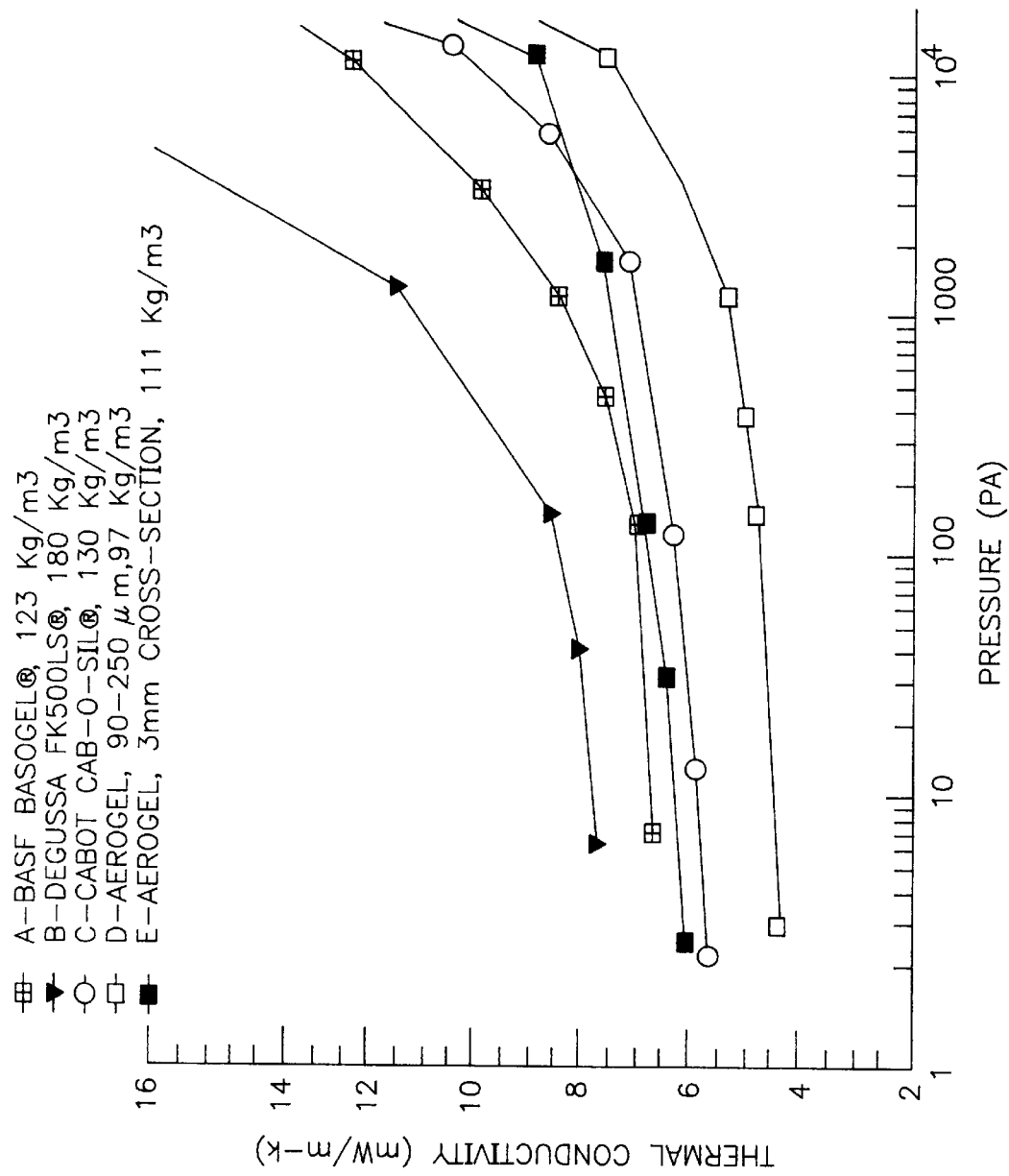
FIG. 8 is another graphical representation of the thermal conductivity (TC) of different materials discussed in Example 1 below.

The density under a 103421 Pa (15 psi) and Thermal Conductivity (TC) of each composition A, B, C, D and E, measured in the manner described above, are as follows and are also reported graphically in FIGS. 7 and 8.

| Composition | Packing Density 103421 Pa Load (kg/m³) | TC at 133.322 Pa (mW/m · K) | TC at 1333.22 Pa (mW/m · K) | TC at 13332.2 Pa (mW/m · K) |
|---|---|---|---|---|
| A | 123 | 6.89 | 8.24 | 12.02 |
| B | 180 | 8.29 | 11.01 | 18.03 |
| C | 130 | 6.14 | 6.77 | 9.81 |
| D | 97 | 4.61 | 5.13 | 7.21 |
| E | 111 | 6.65 | 7.28 | 8.58 |

These results illustrate the advantageous TC achieved by a composition of the present invention D at vacuum levels of 133.322 Pa, 1333.22 Pa and 13332.2 Pa. Gel composition E also falls within the scope of certain aspects of the present invention at 13332.2 Pa.

As illustrated by gel composition D, an embodiment of a composition of the present invention achieves advantageous TC under load, indicating reduced heat transfer through the composition. In the absence of convection, heat transfer occurs through gas phase conduction, solid phase conduction and radiation. The porosity and particle size of a particulate composition will affect the contribution of gas phase conduction to heat transfer. The low packing density of gel composition D, in comparison to the other compositions, reflects the higher porosity of composition D. The higher porosity, in conjunction with the particle size of composition D minimizes gas phase heat transfer. The low packing density also illustrates that composition D has sufficient strength to resist deformation under load to an undesirable extent.

The choice of silica as a gel component in composition D, and composition D's low packing density serve to minimize the solid phase conduction of heat transfer.

The use of an opacifying agent in composition D serves to minimize the radiation component of heat transfer.

EXAMPLE 2

This example illustrates the effect of packing density under a 103421 Pa load on TC. Compositions F and G are prepared utilizing the gel process steps depicted in FIG. 5. Further details are as follows.

Composition F

The carbon black utilized in composition F is carbon black CB-A described above. In composition F carbon black CB-A is not modified.

For the gelation step, the 5% solution is utilized.

For approximately 300 ml gel, 42 ml 2M $H_2SO_4$ is dispensed into a jacketed beaker maintained at 20° C. The solution is titrated into the stirred and jacketed vessel at 20° C. The solution addition rate is 1 ml/min. Once a pH of 3 is reached, the carbon black/water slurry is added and the solution is stirred for several seconds.

A carbon black CB-A/water slurry is prepared by combining 2.79 g of unmodified carbon and 53 g of water and sonicating for 10 minutes. The amounts of added carbon black and water are calculated such that the total solids content of the gel remains the same. In this example 15% of the gel composition, by mass, comprises carbon black CB-A.

After addition of the carbon black CB-A/water slurry, the titration is then continued until the pH reaches 5. A Corning pH meter, model 320, and a Corning "3 in 1" pH Combination Electrode with automatic temperature compensation (Corning, Inc., Corning, N.Y.) is used to measure the pH.

The sol is then poured into casting containers, approximately 90 ml Teflon® containers. Once the sol gels, the containers are placed into an oven at 50° C. for 15 minutes. After the 50° C. oven treatment, the gel is extruded into $3000\mu \times 3000\mu$ cross-section, square granules.

For the salt washing step, the granules are exchanged with room temperature deionized water 4 times for 90 minutes each at a volume ratio 6:1 (water:gel).

For the aging step, the excess water is removed and only the pore fluid is retained. The granules are then aged 90 minutes at 80° C.

For the solvent exchange step, the granules are exchanged 4 times with acetone to remove the water. The exchanges are performed with a volume ratio of 6:1 (acetone:gel) for a minimum of 90 minutes for each exchange at room temperature.

A second solvent exchange step is used. The granules are exchanged 4 times with heptane to remove the acetone. The exchanges are performed at a volume ratio of 6:1 (heptane:gel) for a minimum of 90 minutes for each exchange at room temperature.

For the TMCS treatment step, trimethylchlorosilane (TMCS) is added to the gel/heptane mixture at a level of 0.15 g TMCS/g wet gel for 3½ hours.

For the solvent removal step, the granules are placed in a 80° C. oven for overnight. Next, the granules are placed in a 120° C. oven for 2 hours for final solvent removal.

After the chemical processing is completed, the granules are ground in a coffee grinder (Bunn, GL1). FIG. 6 demonstrates a typical particle size distribution after grinding.

Composition G

The carbon black utilized in composition G is carbon black CB-B. In composition G carbon black CB-B is not modified.

For the gelation step, the 8% solution is utilized.

For approximately 680 ml gel, 145 ml 2M $H_2SO_4$ is dispensed into a jacketed beaker maintained at 20° C. The solution is titrated into the stirred and jacketed vessel at 20° C. The solution addition rate is 1 ml/min. Once a pH of 3 is reached, the carbon black/water slurry is added and the solution is stirred for several seconds.

An carbon black CB-A/water slurry is prepared by combining 10.06 g of carbon black CB-A and 118 g of water and sonicating for 10 minutes. The amounts of added carbon black and water are calculated such that the total solids content of the gel remains the same. In this example 15% of the gel composition, by mass, comprises carbon black CB-B.

After addition of the carbon black/water slurry, the titration is then continued until pH=5. A Corning pH meter, model 320, and a Corning "1 in 1" pH Combination Electrode with automatic temperature compensation (Corning, Inc., Corning, N.Y.) is used to measure the pH.

The sol is then poured into casting containers, approximately 90 ml Teflon® containers. Once the sol gels, the containers are placed into an oven at 50° C. for 15 minutes. After the 50° C. oven treatment, the gel is extruded into $3000\mu \times 3000\mu$ cross-section, square granules.

For the remaining steps, 5 gel batches (approx. 680 ml size) were combined for processing.

For the salt washing step, the granules are exchanged with room temperature deionized water 6 times for 90 minutes each at a volume ratio 1:1 (water:gel).

For the aging step, the excess water is removed and only the pore fluid is retained. The granules are then aged 12–14 hr @ at 50° C.

For the solvent exchange step, the granules are exchanged 8 times in counter-current mode with acetone to remove the water. The exchanges are performed with a volume ratio of 1:1 (acetone:gel) for a minimum of 90 minutes for each exchange at room temperature.

A second solvent exchange step is used. The granules are exchanged 2 times in counter-current mode with heptane to remove the acetone. The exchanges are performed at a volume ratio of 1:1 (heptane:gel) for a minimum of 90 minutes for each exchange at room temperature.

For the TMCS treatment step, trimethylchlorosilane (TMCS) is added to the gel/heptane mixture at a level of 0.1 g TMCS/g wet gel for 3 hours.

For the solvent removal step, the granules are placed in a 160° C. oven for overnight.

After the chemical processing is completed, the granules are ground in a coffee grinder (Bunn, GL1). FIG. 6 demonstrates a typical particle size distribution after grinding.

The Thermal Conductivities (TC) and packing density under a 103421 Pa load of compositions F and G are determined utilizing the procedures set forth above. The results are reported below and also reported graphically in FIG. 8.

| Composition | Packing Density 103421 Pa (kg/m³) | TC at 133.322 Pa (mW/m · K) | TC at 1333.22 Pa (mW/m · K) | TC at 13332.2 Pa (mW/m · K) |
|---|---|---|---|---|
| F | 116 | 5.77 | 6.44 | 7.59 |
| G | 151 | 8.48 | 11.18 | 13.73 |

These results illustrate the effects of packing density under load on TC.

Packing density under load provides an indication of the strength and porosity of a particulate composition. The packing density of composition F of the present invention provides an indication that the composition has sufficient strength to maintain its porosity and to minimize its deformation under load so as to minimize the contribution of solid phase conduction to heat transfer which would undesirably increase its TC.

EXAMPLE 3

This example illustrates the effect of particle size on TC and packing density under 103421 Pa (15 psi) load.

Compositions H, I and J are prepared utilizing the gel process steps depicted in FIG. 5. Further details are as follows.

Composition H

Composition H is prepared in the same manner as composition D above from gelation through solvent removal.

After the chemical processing is completed, the granules are ground in a coffee grinder (Bunn, GL1). FIG. 6 demonstrates a typical particle size distribution after grinding.

The resulting powder is sieved to separate the less than 90 $\mu$m size range of particles using a CSC Scientific Sieve Shaker, model 18480 at setting 2.5 for 15 minutes.

Composition I

Composition I is prepared in the same manner as composition D above from gelation through solvent removal.

After the chemical processing is completed, the granules are ground in a coffee grinder (Bunn, GL1). FIG. 6 demonstrates a typical particle size distribution after grinding.

The resulting powder is sieved to separate the 90–250 $\mu$m size range of particles using a CSC Scientific Sieve Shaker, model 18480, at setting 2.5 for 15 minutes.

Composition J

Composition J is prepared in the same manner as composition D from gelation through solvent removal.

After the chemical processing is completed, the granules are ground in a coffee grinder (Bunn, GL1). FIG. 6 demonstrates a typical particle size distribution after grinding.

The resulting powder is sieved to separate the 250–500 $\mu$m size range of particles using a CSC Scientific Sieve Shaker, model 18480, at setting 2.5 for 15 minutes.

Figure 9:
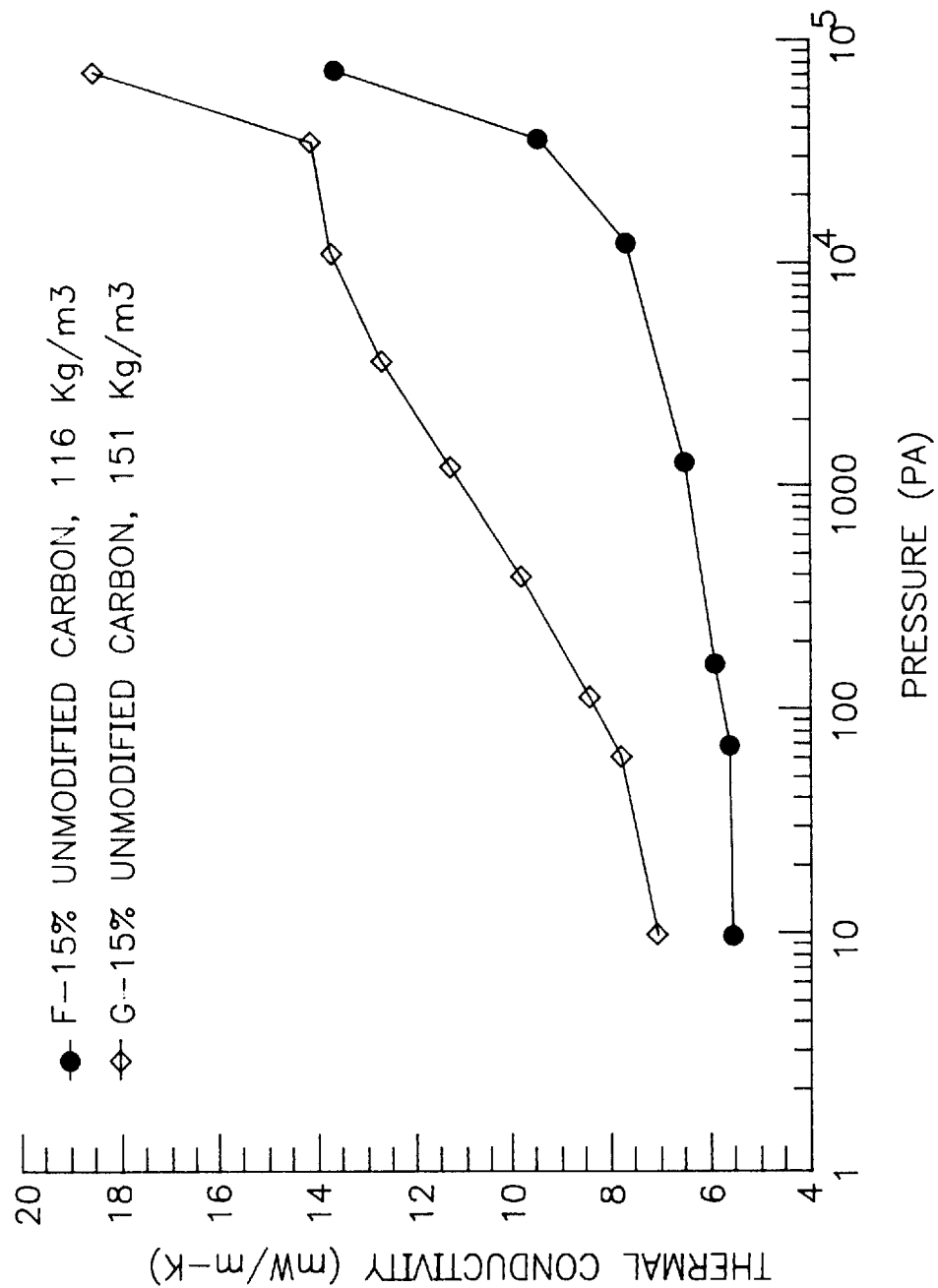
FIG. 9 is a graphical representation of the thermal conductivity (TC) of materials which differ in packing density, and is discussed in Example 2 below.
Figure 10:
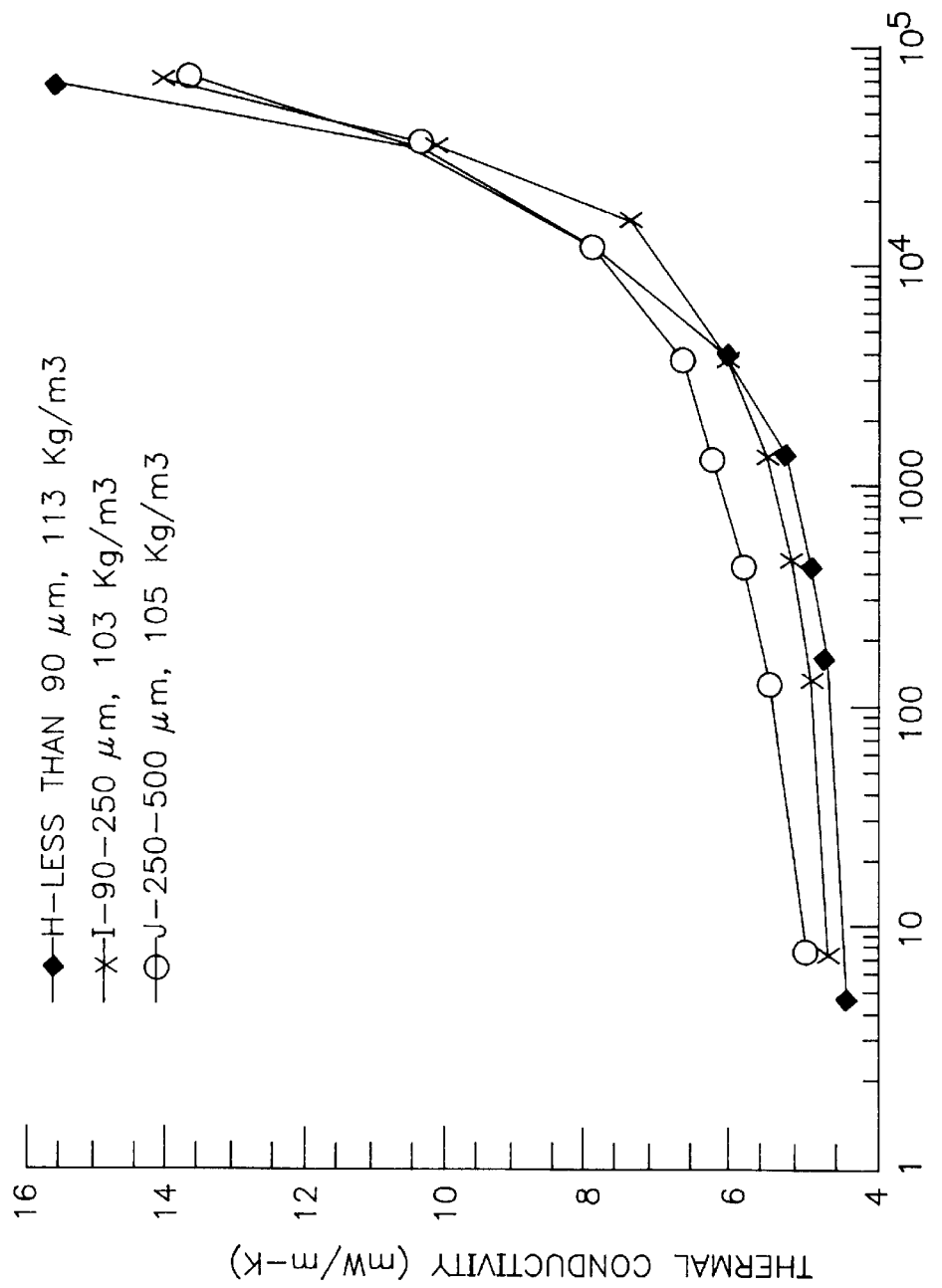
FIG. 10 is a graphical representation of the thermal conductivity (TC) of materials which differ in particle size and is discussed in Example 3 below.

The density under 103421 Pa load and Thermal Conductivities of each composition H, I and J, measured in the manner described above, are as follows and are also reported graphically in FIG. 9.

| Composition | Particle Size ($\mu$m) | Packing Density 103421 Pa (kg/m$^3$) | TC at 133.322 Pa (mW/m · K) | TC at 1333.22 Pa (mW/m · K) | TC at 13332.2 Pa (mW/m · K) |
|---|---|---|---|---|---|
| H | less than 90 | 113 | 4.49 | 5.01 | 7.75 |
| I | 90–250 | 103 | 4.71 | 5.24 | 6.87 |
| J | 250–500 | 105 | 5.34 | 6.08 | 7.75 |

These results illustrate the effect of particle size on TC and packing density under a 103421 Pa load. Compositions H, I and J are all compositions of the present invention but have different packing densities and TC's.

As illustrated by a comparison of compositions H and I, a decrease in particle size leads to an increase in packing density, however the decrease in particle size also leads to decreased TC's at pressures of 133.322 Pa and 1333.22 Pa. At the larger particle size range represented by Examples I and J, an increase in particle size at nearly constant packing density leads to an increase in TC.

EXAMPLE 4

This example illustrates the effect of the type and presence of an opacifying agent on TC and packing density under a 103421 Pa load.

Composition K, a control composition, is prepared with no opacifying agent. Composition L is prepared utilizing a physical mixture of an unmodified carbon black CB-A. Composition N is also prepared utilizing unmodified carbon black CB-A. Composition M is prepared utilizing a modified carbon black CB-A. Carbon black CB-A and Modified Carbon Black CB-A are described above.

Compositions K, L, M and N are prepared utilizing the gel process steps depicted in FIG. 5. Further details are as follows.

Composition K

For the gelation step, the 5% solution is utilized.

For approximately 800 ml gel, 110 ml 2M $H_2SO_4$ is dispensed into a jacketed beaker maintained at 20° C. The solution is titrated into the stirred and jacketed vessel at 20° C. The solution addition rate is 5 ml/min. The titration is continued until the pH is 5. A Corning pH meter, model 320, and a Corning "3 in 1" pH Combination Electrode with automatic temperature compensation (Corning, Inc., Corning, N.Y.) is used to measure the pH.

The sol is then poured into casting containers, approximately 90 ml Teflon® containers. Once the sol gels, the containers are placed into an oven at 50° C. for 15 minutes. After the 50° C. oven treatment, the gel is extruded into 3000$\mu$×3000$\mu$ cross-section, square granules.

After the first salt wash, 4 batches (approx. 800 ml) are combined for the remainder of the processing.

For the salt washing step, the granules are exchanged with room temperature deionized water 5 times, 1st water wash is overnight, 2nd through 5th wash is 45 minutes. All wash volume ratios are 1.5:1 (water:gel).

For the aging step, the excess water is removed and only the pore fluid is retained. The granules are then aged 15 hours at 50° C.

For the solvent exchange step, the granules are exchanged 11 times with acetone in a counter-current mode to remove the water. The exchanges are performed with a volume ratio of 1:1 (acetone:gel) for a minimum of 45 minutes for each exchange at room temperature.

A second solvent exchange step is used. The granules are exchanged 2 times with heptane in a counter-current mode to remove the acetone. The exchanges are performed at a volume ratio of 1:1 (heptane:gel) for a minimum of 45 minutes for each exchange at room temperature. The granules are then placed in 2000 ml of fresh heptane before proceeding to trimethylchlorosilane addition.

For the TMCS treatment step, trimethylchlorosilane (TMCS) is added to the gel/heptane mixture at a level of 0.1 g TMCS/g wet gel for 3½ hours.

For the solvent removal step, the granules are placed in a 160° C. oven for overnight.

After the chemical processing is completed, the granules are ground in a coffee grinder (Bunn, GL1). FIG. 6 demonstrates a typical particle size distribution after grinding.

Composition L

Composition L is prepared in the same manner as Composition K from gelation through solvent removal.

After the chemical processing is completed, the granules are ground in a coffee grinder (Bunn, GL1). FIG. 6 demonstrates a typical particle size distribution after grinding.

The ground aerogel sample is combined with unmodified Carbon Black CB-A to give a 15% by weight mixture of carbon black in an aerogel and carbon mixture. This mixture is mixed until a uniform appearance is achieved.

Composition M

For the gelation step, the 5% solution is utilized.

For approximately 300 ml gel, 42 ml 2M $H_2SO_4$ is dispensed into a jacketed beaker maintained at 20° C. The solution is titrated into the stirred and jacketed vessel at 20° C. The solution addition rate is 1 ml/min. Once a pH of 3 is reached, the carbon black/water slurry is added and the solution is stirred for several seconds.

A modified carbon black CB-A/water slurry is prepared by combining 2.79 g of modified carbon black CB-A and 53 g of water and sonicating for 2 minutes. The amounts of added carbon black and water are calculated such that the total solids content of the gel remains the same. In this example 15% of the gel composition, by mass, comprises modified carbon black CB-A.

After addition of the modified carbon black CB-A/water slurry, the titration is then continued until a pH of 5. A Corning pH meter, model 320, and a Corning "3 in 1" pH Combination Electrode with automatic temperature compensation (Corning, Inc., Corning, N.Y.) is used to measure the pH.

The sol is then poured into casting containers, approximately 90 ml Teflon® containers. Once the sol gels, the containers are placed into an oven at 50° C. for 15 minutes. After the 50° C. oven treatment, the gel is extruded into 3000μ×3000μ cross-section, square granules.

For the salt washing step, the granules are exchanged with room temperature deionized water 6 times over 5 hours at a volume ratio 6:1 (water:gel).

For the aging step, the excess water is removed and only the pore fluid is retained. The granules are then aged 60 minutes at 80° C.

For the solvent exchange step, the granules are exchanged 5 times with acetone to remove the water. The exchanges are performed with a volume ratio of 6:1 (acetone:gel) for a minimum of 90 minutes for each exchange at room temperature.

A second solvent exchange step is used. The granules are exchanged 5 times with heptane to remove the acetone. The exchanges are performed at a volume ratio of 6:1 (heptane:gel) for a minimum of 90 minutes for each exchange at room temperature.

For the TMCS treatment step, trimethylchlorosilane (TMCS) is added to the gel/heptane mixture at a level of 0.1 g TMCS/g wet gel for overnight. After the TMCS treatment, gels are washed twice in heptane to remove any unreacted TMCS.

For the solvent removal step, the granules are placed in a 50° C. oven for 4 hours. Next, the granules are placed in a 80° C. oven overnight, and the final solvent removal step for the granules is 2 hours in a 120° C. oven.

After the chemical processing is completed, the granules are ground in a coffee grinder (Bunn, GL1). FIG. 6 demonstrates a typical particle size distribution after grinding.

Composition N

Composition N is prepared in the same manner as Composition F above.

Figure 11:
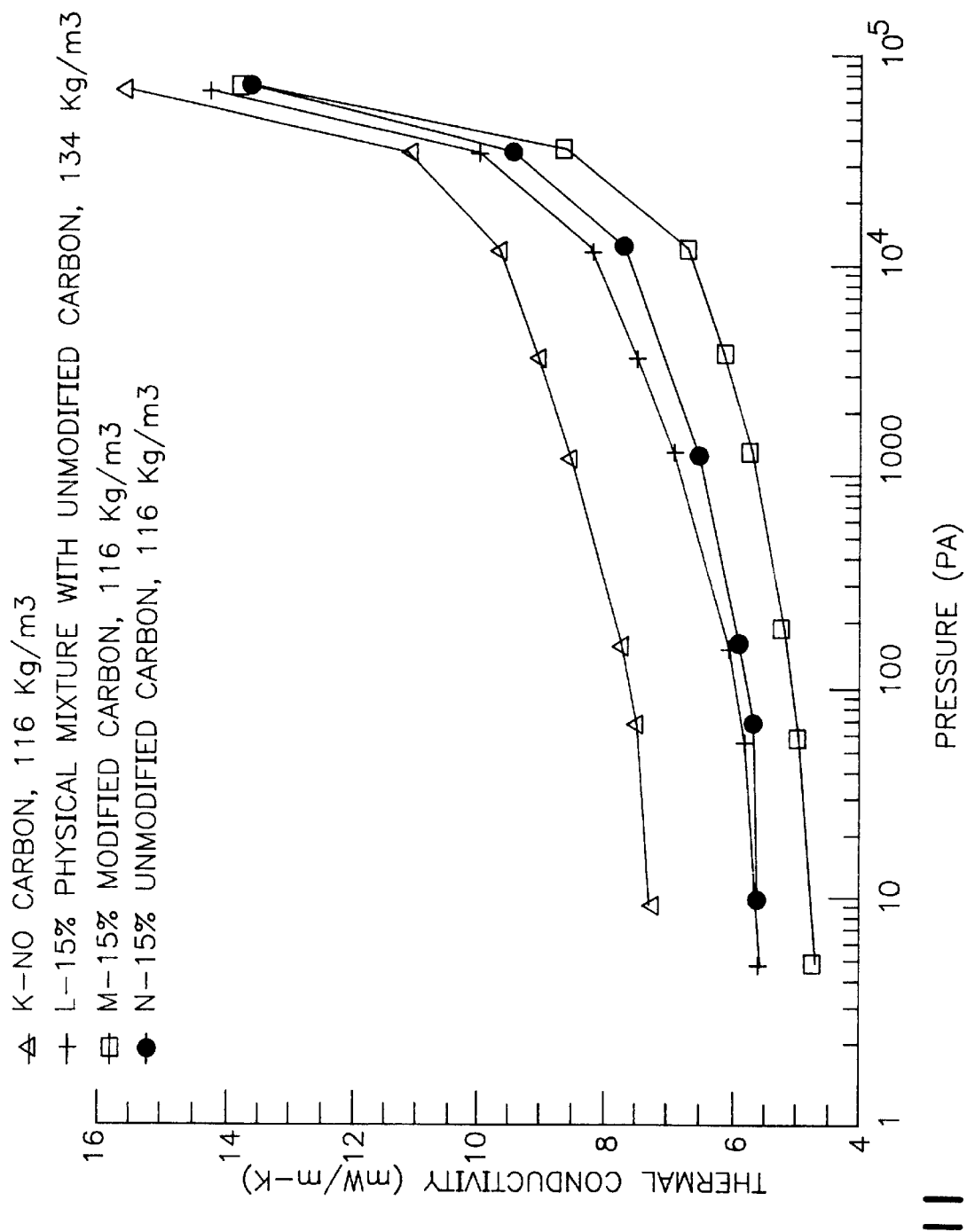
FIG. 11 is a graphical representation of the thermal conductivity (TC) of materials which differ in the type and presence of an opacifying agent and is discussed in Example 4 below.

The density under a 103421 Pa load and Thermal Conductivities of each composition K, L, M and N, measured in the manner described above, are as follows and are also reported graphically in FIG. 11.

| Composition | Opacifying Agent | Packing Density 103421 Pa (kg/m³) | TC at 133.322 Pa (mW/m · K) | TC at 1333.22 Pa (mW/m · K) | TC at 13332.2 Pa (mW/m · K) |
|---|---|---|---|---|---|
| K | None | 116 | 7.59 | 8.43 | 9.61 |
| L | CB-A | 134 | 5.91 | 6.80 | 8.10 |
| M | Modified CB-A | 116 | 5.01 | 5.59 | 6.61 |
| N | CB-A | 116 | 5.77 | 6.44 | 7.59 |

These results illustrate the effect of the type and presence of an opacifying agent on TC and packing density under a 103421 Pa load.

For a given amount of opacifier, in particular carbon black, the manner in which the opacifying agent is included in the composition will affect the solid phase component of heat transfer.

A comparison of the TC's of Compositions L, M and N, to the TC of composition K, illustrates that the presence of an opacifying agent reduces TC. The lowest TC's in this Example are achieved by composition M utilizing an opacifying agent which is "attached" to the gel precursor.

EXAMPLE 5

This example illustrates the effect of the amount of a carbon black opacifying agent on TC.

Composition O is prepared without an opacifying agent. Composition P is prepared utilizing a modified carbon black CB-A. Composition Q is also prepared utilizing a modified carbon black CB-A. Modified carbon black CB-A is described in Example 1 above.

Compositions O, P and Q are prepared utilizing the gel process steps depicted in FIG. 5. Further details are as follows.

Composition O

Composition N is prepared in the same manner and is the same composition as Composition K above.

Composition P

For the gelation step, the 5%-alternate solution is utilized.

For approximately 5000 ml gel, combine 1235 ml of deionized water and 65 ml of concentrated sulfuric acid (98%, J. T. Baker) in a jacketed reaction flask at 23° C. The solution is titrated into the stirred and jacketed vessel at 23° C. The solution addition rate is 40 ml/min. until the pH is 3. Once a pH of 3 is reached, the carbon black/water slurry is added and the solution is stirred for several seconds.

A modified carbon black CB-A/water slurry is prepared by combining 25.43 g of modified carbon and 492 ml of water and sonicating for 2 minutes. The amounts of added carbon black and water are calculated such that the total solids content of the gel remains the same. In this Example, 10% of the gel composition, by mass, comprises modified carbon black CB-A.

After addition of the modified carbon black CB-A/water slurry, the titration is then continued until pH of 5 at an addition rate of 12 ml/min. A Hanna pH meter, model HI8510E, and a Cole-Parmer pH Electrode, model 5662-31, is used to measure the pH.

The sol is mixed in the reaction flask for 25 min. after a pH of 5 is reached. The sol is then poured into two 29.21 cm×17.78 cm×7.62 polypropylene casting containers (11.5 inch×7 inch×3 inch polypropylene containers). The containers are placed in a 65° C. oven for 25 minutes. After the 65° C. oven treatment, the gel is extruded into 3000μ×3000μ cross-section, square granules. The gel is extruded into 4 liters of water for overnight.

For the aging step, the excess water is removed and replaced with 1.6 L of 65° C. water. The granules are then placed in a 79° C. oven for 5½ hours.

For the salt washing step, the granules are exchanged with room temperature deionized water 2 times for 60 minutes at a volume ratio of 3:1 (water:gel).

For the solvent exchange step, the granules are exchanged 5 times with acetone in a counter-current mode to remove the water. The exchanges are performed with a volume ratio of 3:1 (acetone:gel) for a minimum of 60 minutes for each exchange at room temperature.

A second solvent exchange step is used. The granules are exchanged 2 times with heptane in a counter-current mode to remove the acetone. The exchanges are performed at a volume ratio of 3:1 (heptane:gel) for a minimum of 60 minutes for each exchange at room temperature.

For the TMCS treatment step, trimethylchlorosilane (TMCS) is added to the gel/heptane mixture at a level of 0.1 g TMCS/g wet gel for a minimum of 3 hours.

For the solvent removal step, the granules are placed in a 150° C. oven for overnight.

After the chemical processing is completed, the granules are ground in a coffee grinder (Bunn, GL1). FIG. 6 demonstrates a typical particle size distribution after grinding.

Composition Q

Composition Q is prepared in the same manner as Composition M above.

Figure 12:
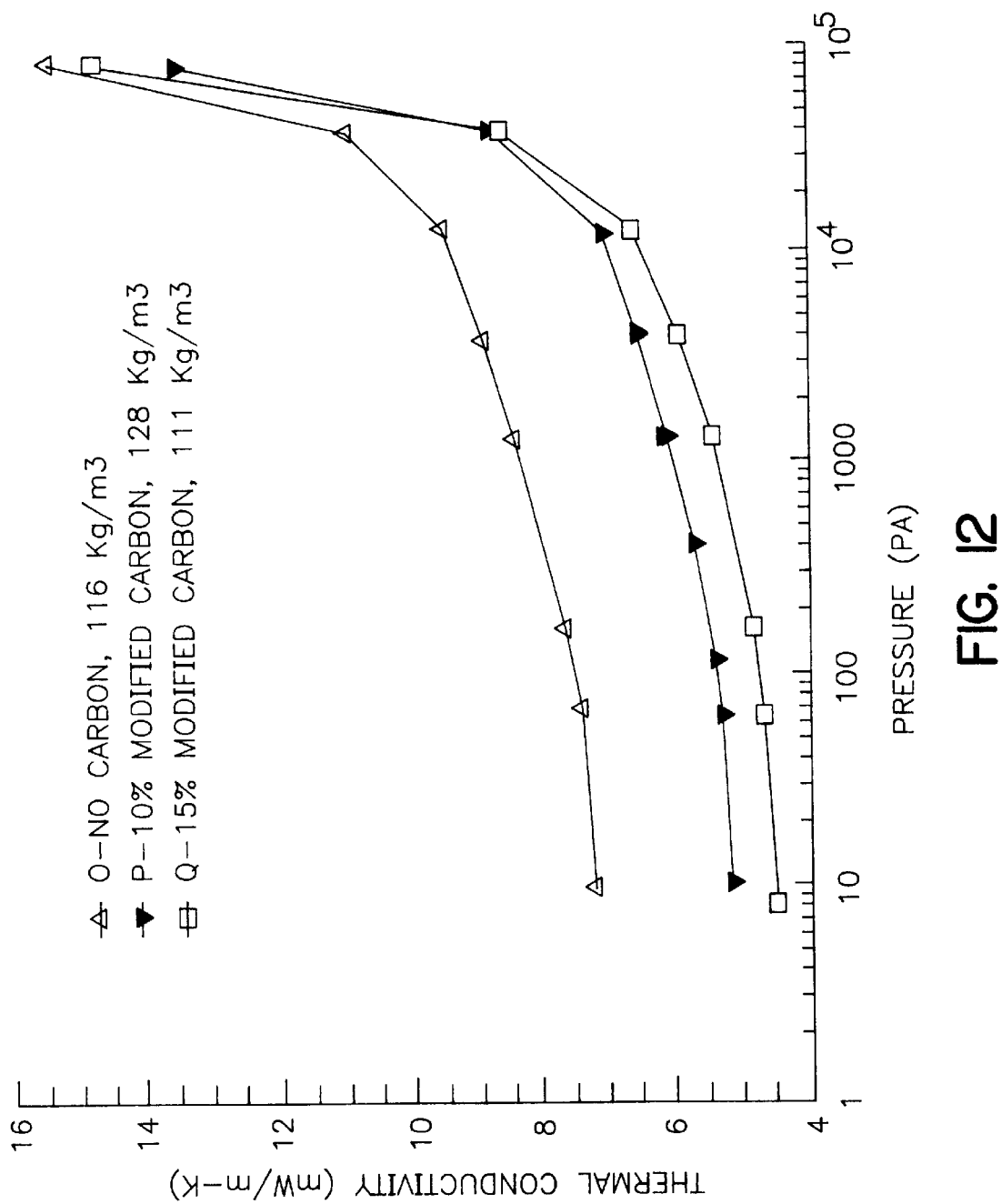
FIG. 12 is a graphical representation of the thermal conductivity (TC) of materials which differ in the type and presence of a carbon black opacifying agent and is discussed in Example 5 below.

The density under a 103421 Pa load and Thermal Conductivities of each composition O, P and Q, measured in the manner described above, are as follows and are also reported graphically in FIG. 12.

| Composition | Modified CB-A %, by weight | Packing Density 103421 Pa (kg/m³) | TC at 133.322 Pa | TC at 1333.22 Pa | TC at 13332.2 Pa |
|---|---|---|---|---|---|
| O | 0 | 116 | 7.59 | 8.43 | 9.61 |
| P | 10 | 128 | 5.42 | 6.06 | 7.14 |
| Q | 15 | 111 | 4.89 | 5.50 | 6.61 |

These results illustrate the effect of the amount of a carbon black opacifying agent on TC. Compositions P and Q which include opacifying agents, have lower TC values than composition O, which does not include an opacifying agent. Composition Q, with a higher amount of opacifying agent, has lower TC's than composition P.

It should be clearly understood that the forms of the present invention herein described are illustrative only and are not intended to limit the scope of the invention.

We claim:

1. A particulate composition comprising metal oxide, which under a 103421 Pa load, at 20° C., and at a pressure within the range of 133.322–13332.2 Pa, in Nitrogen, has:

a packing density of less than or equal to 160 kg/M³, and a Thermal Conductivity at 133.322–1333.22 Pa of less than or equal to (0.260 lnP+4.53) milliWatt/meterK and a Thermal Conductivity at 1333.22–13332.2 Pa of less than or equal to (0.824 lnP+0.47) milliWatt/meterK.

2. The particulate composition of claim 1 wherein the composition is a gel composition.

3. The composition of claim 2 wherein the gel composition comprises a gel component and an opacifying agent.

4. The composition of claim 3 wherein the opacifying agent comprises carbon black; activated carbon; graphite; composites comprising carbon black and metal oxide or mixtures thereof.

5. The composition of claim 4 wherein the gel composition comprises greater than or equal to 3%, by weight, opacifying agent.

6. The composition of claim 4 wherein the opacifying agent is carbon black.

7. The composition of claim 2 wherein the packing density is less than or equal to 140 kg/m³.

8. The composition of claim 2 wherein the Thermal Conductivity at 133.322–1333.22 Pa is less than or equal to (0.304 lnP+3.91) milliWatt/meterK and the Thermal Conductivity at 1333.22–13332.2 Pa is less than or equal to (0.825 lnP+0.16) milliWatt/meterK.

9. The composition of claim 2 wherein the composition has a an average particle size of between 50–500 microns.

10. The composition of claim 2 wherein the composition has a porosity of greater than or equal to 0.90.

11. A particulate gel composition comprising a silica gel component and an opacifying agent, the gel composition having under a 103421 Pa load, at 20° C., and at a pressure within the range of 133.322–13332.2 Pa, in Nitrogen:

a packing density of less than or equal to 160 kg/m³;

a Thermal Conductivity at 133.322–1333.22 Pa of less than or equal to (0.260 lnP+4.53) milliWatt/meterK and a Thermal Conductivity at 1333.22–13332.2 Pa of less than or equal to (0.824 lnP+0.47) milliWatt/meterK;

an average particle size of between 50–500 microns; and a porosity of greater than or equal to 0.90.

12. The particulate gel composition of claim 11 wherein the opacifying agent comprises carbon black.

13. A particulate composition comprising metal oxide, which under a 103421 Pa load, at 20° C., and at a pressure of 1333.22 Pa, in Nitrogen, has:

a packing density of less than or equal to 160 kg/m³ and a Thermal Conductivity of less than or equal to 6.4 milliWatt/meterK.

14. The particulate composition of claim 13 wherein the composition is a gel composition.

15. The composition of claim 14 wherein the gel composition comprises a gel component and an opacifying agent.

16. The composition of claim 15 wherein the opacifying agent comprises carbon black; activated carbon; graphite; composites comprising carbon black and metal oxide or mixtures thereof.

17. The composition of claim 16 wherein the gel composition comprises greater than or equal to 3%, by weight, opacifying agent.

18. The composition of claim 16 wherein the opacifying agent is carbon black.

19. The composition of claim 14 wherein the packing density is less than or equal to 140 kg/m³.

20. The composition of claim 14 wherein the Thermal Conductivity is less than or equal to 6.1 milliWatt/meterK.

21. The composition of claim 14 wherein the composition has an average particle size of between 50–500 microns.

22. The composition of claim 14 wherein the composition has a porosity of greater than or equal to 0.90.

23. A particulate gel composition comprising a silica gel component and an opacifying agent, the gel composition having under a 103421 Pa load, at 20° C., and at a pressure of 1333.22 Pa, in Nitrogen:

a packing density of less than or equal to 160 kg/M³;

a Thermal Conductivity of less than or equal to 6.4 milliWatt/meterK;

an average particle size of between 50–500 microns; and a porosity of greater than or equal to 0.90.

24. The particulate gel composition of claim 23 wherein the opacifying agent comprises carbon black.

25. A particulate composition comprising metal oxide, which under a 103421 Pa load, at 20° C., and at a pressure of 133.322 Pa, in Nitrogen, has:

a packing density of less than or equal to 160 kg/M³ and a Thermal Conductivity of less than or equal to 5.8 milliWatt/meterK.

26. The particulate composition of claim 25 wherein the composition is a gel composition.

27. The composition of claim 26 wherein the gel composition comprises a gel component and an opacifying agent.

28. The composition of claim 27 wherein the opacifying agent comprises carbon black; activated carbon; graphite; composites comprising carbon black and metal oxide or mixtures thereof.

29. The composition of claim 28 wherein the gel composition comprises greater than or equal to 3%, by weight, opacifying agent.

30. The composition of claim 28 wherein the opacifying agent is carbon black.

31. The composition of claim 26 wherein the packing density is less than or equal to 140 kg/m³.

32. The composition of claim 26 wherein the Thermal Conductivity is less than or equal to 5.4 milliWatt/meterK.

33. The composition of claim 26 wherein the composition has a an average particle size of between 50–500 microns.

34. The composition of claim 26 wherein the composition has a porosity of greater than or equal to 0.90.

35. A particulate gel composition comprising a silica gel component and an opacifying agent, the gel composition having under a 103421 Pa, at ambient temperature, and at a pressure of 133.322 Pa, in Nitrogen:

a packing density of less than or equal to 160 kg/m$^3$;

a Thermal Conductivity of less than or equal to 5.8 milliWatt/meterK;

an average particle size of between 50–500 microns; and a porosity of greater than or equal to 0.90.

36. The particulate gel composition of claim 35 wherein the opacifying agent comprises carbon black.

37. A particulate composition comprising metal oxide, which under a 103421 Pa load, at ambient temperature, and at a pressure of 13332.2 Pa, in Nitrogen, has:

a packing density of less than or equal to 160 kg/m$^3$, and a Thermal Conductivity of less than or equal to 9 milliWatt/meterK.

38. The particulate composition of claim 37 wherein the composition is a gel composition.

39. The composition of claim 38 wherein the gel composition comprises a gel component and an opacifying agent.

40. The composition of claim 39 wherein the opacifying agent comprises carbon black; activated carbon; graphite; composites comprising carbon black and metal oxide or mixtures thereof.

41. The composition of claim 40 wherein the gel composition comprises greater than or equal to 3%, by weight, opacifying agent.

42. The composition of claim 40 wherein the opacifying agent is carbon black.

43. The composition of claim 38 wherein the packing density is less than or equal to 140 kg/m$^3$.

44. The composition of claim 38 wherein the Thermal Conductivity is less than or equal to 8 milliWatt/meterK.

45. The composition of claim 38 wherein the composition has an average particle size of between 50–500 microns.

46. The composition of claim 38 wherein the composition has a porosity of greater than or equal to 0.90.

47. A particulate gel composition comprising a silica gel component and an opacifying agent, the gel composition having under a 103421 Pa load, at ambient temperature, and at a pressure of 13332.2 Pa, in Nitrogen:

a packing density of less than or equal to 160 kg/m$^3$;

a Thermal Conductivity of less than or equal to 9 milliWatt/meterK;

an average particle size of between 50–500 microns; and a porosity of greater than or equal to 0.90.

48. The particulate gel composition of claim 47 wherein the opacifying agent comprises carbon black.

49. An insulation body comprising the particulate composition of claim 1.

50. The insulation body of claim 49 wherein the particulate composition is a gel composition.

51. An insulation body comprising the particulate composition of claim 13.

52. The insulation body of claim 51 wherein the particulate composition is a gel composition.

53. An insulation body comprising the particulate composition of claim 25.

54. The insulation body of claim 53 wherein the particulate composition is a gel composition.

55. An insulation body comprising the particulate composition of claim 37.

56. The insulation body of claim 55 wherein the particulate composition is a gel composition.

57. A thermal insulation medium in a refrigeration appliance comprising the insulation body of claim 52.

\* \* \* \* \*